United States Patent
Hirano et al.

(10) Patent No.: US 8,199,134 B2
(45) Date of Patent: Jun. 12, 2012

(54) INPUT DEVICE

(75) Inventors: Shinji Hirano, Fukushima-ken (JP);
Naoyuki Hatano, Fukushima-ken (JP);
Hideki Ito, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 867 days.

(21) Appl. No.: 11/839,988

(22) Filed: Aug. 16, 2007

(65) Prior Publication Data

US 2008/0055281 A1 Mar. 6, 2008

(30) Foreign Application Priority Data

Aug. 30, 2006 (JP) .................................. 2006-234452
Aug. 30, 2006 (JP) .................................. 2006-234459
Nov. 14, 2006 (JP) .................................. 2006-307841

(51) Int. Cl.
*G06F 3/033* (2006.01)
(52) U.S. Cl. ........................................ 345/184; 345/156
(58) Field of Classification Search ........... 345/156–184
See application file for complete search history.

(56) References Cited

U.S. PATENT DOCUMENTS

| | | | |
|---|---|---|---|
| 5,659,334 A | 8/1997 | Yaniger et al. | |
| 6,484,119 B1 | 11/2002 | Kaneo et al. | |
| 2003/0218598 A1 | 11/2003 | Shibata | |
| 2004/0145577 A1* | 7/2004 | Yajima et al. | 345/173 |
| 2005/0231476 A1* | 10/2005 | Armstrong | 345/161 |

FOREIGN PATENT DOCUMENTS

| | | |
|---|---|---|
| JP | 9-54654 | 2/1997 |
| JP | 9-128140 | 5/1997 |
| JP | 9-507315 | 7/1997 |
| JP | 2000-267803 | 9/2000 |
| JP | 2001-350581 | 12/2001 |
| JP | 2002-163960 | 6/2002 |
| JP | 2003-296016 | 10/2003 |

OTHER PUBLICATIONS

Office Action issued in corresponding Chinese Patent Application No. 2006-234459; mailed Jan. 20, 2009.
Office Action issued in corresponding Chinese Patent Application No. 2006-234452; mailed Jan. 20, 2009.

* cited by examiner

*Primary Examiner* — Kevin M Nguyen
*Assistant Examiner* — Cory Almeida
(74) *Attorney, Agent, or Firm* — Brinks Hofer Gilson & Lione

(57) ABSTRACT

A thin input device can be made small and thin, and prevent an excessive force from acting on a connecting part with a substrate when an operating part is operated to detect deformation of an actuating member. An actuating member is received in a recess of a lower case, and a lid is fixed. The actuating member includes fixed parts provided at four corners and deformable parts thinner than the fixed parts. The fixed parts are fixedly sandwiched between a bottom surface of the recess of the lower case and the lid. The deformable parts, to which strain detecting elements are attached, are provided in four directions around the operating part. When the operating knob is operated to deform a deformable part, the force acts only on the case, and an excessive force does not act on connecting parts between the connecting terminals, and a substrate.

20 Claims, 22 Drawing Sheets

INPUT DEVICE

This application claims the benefit of Japanese Patent Application Nos. 2006-234452 and 2006-234459, filed on Aug. 30, 2006, and Japanese Patent Application No. 2006-307841, filed on Nov. 14, 2006, the entire contents of which is hereby incorporated by reference.

BACKGROUND

1. Field of the Invention

The present invention relates to an input device including an actuating member that is deformed by an operating force applied from the outside and detecting elements that detects deformation of the actuating member.

2. Description of the Related Art

An input device from which a rod-shaped operating part projects, along with a keyboard device, is mounted on an operation unit of a personal computer. In this input device, deformable parts that extend in four directions are provided at the periphery of the rod-shaped operating part, and strain detecting elements are stuck on the deformable parts, respectively. When the operating part is tilted with a finger, any one of the deformable parts that extend in the four directions is deformed, and the amount of the deformation is detected by a strain detecting element. This deformation amount can be output as X-Y coordinate data based on the direction in which the operating part is tilted, and the magnitude of a load applied to the operating part.

A conventional input device has an operating part, deformable parts, and fixed parts. The fixed parts are fixed to a supporting plate formed of a metal sheet, and the supporting plate is fixed to a substrate of a keyboard device, etc. in an operation unit of a personal computer. Therefore, the input device itself becomes large, and the supporting plate must be individually designed and manufactured in order to adapt to the structure of a substrate of a keyboard device, etc on which the supporting plate is mounted.

In input devices of the type described, for example, in JP-A-2001-331270, JP-A-2001-331271, and JP-A-2000-267803 an operating part, deformable parts, and fixed parts are integrally formed, and strain detecting elements are attached to the deformable parts, respectively. Also, the operating part, the deformable parts, and the fixed parts are configured so that they can be directly mounted on a member integrally formed in a substrate, etc.

As described in JP-A-2001-331270, JP-A-2001-331271, and JP-A-2000-267803, when a member in which the operating part, the deformable parts, and the fixed parts are integrally formed is configured so that it can be directly mounted on a substrate, etc., the input devices can be made small and the input devices can be commonly used for a plurality of keyboard devices.

However, in each of the input devices described in JP-A-2001-331270, JP-A-2001-331271, and JP-A-2000-267803, the fixed parts of the member are directly fixed to the substrate. Therefore, when the operating part is operated to give strain to a deformable part, a stress also acts on the fixed parts, and thus a fixing structure between the fixed parts and the substrate may be broken. In the input devices described in JP-A-2001-331270, and JP-A-2001-331271, the fixed parts are fixed to the substrate, etc. only by soldering. Soldered parts are readily broken when the operating part is operated. Further, in the input device described in JP-A-2001-331271, fittings exclusively for fixing the input devices are required. Therefore, the fixing structure that fixes the input devices to the substrate becomes complicated.

Further, in all the input devices described in JP-A-2001-331270, JP-A-2001-331271, and JP-A-2000-267803, the deformable parts and the fixed parts are integrally formed of the same thickness. Therefore, it is difficult to concentrate a strain on a deformable part when the operating part is operated, and an operating force directly acts on the fixed parts, thereby readily breaking connecting parts between the fixed parts and the substrate, etc.

Moreover, in conventional input devices, the deformable parts are exposed to the outside. Consequently, when external components, external mechanisms, etc. strike the deformable parts, and even a small force acts on the deformable parts, the detecting elements may function erroneously.

SUMMARY

According to a first aspect an input device is provided that includes a case, an actuating member received in the case, and a detecting element that detects deformation of the actuating member. An operating part, a fixed part, and a deformable part, which is deformable by operating force acting on the operating part, are integrally formed in the actuating member, and the detecting element is provided in the deformable part. The fixed part is fixed within the case, and the operating part and the deformable part are made movable within the case.

In the input device according to the first aspect of the invention, the actuating member is held inside a case, and this case is mounted on a substrate of a keyboard device, etc. Therefore, when an operating force acts on the operating part of the actuating member to give a strain to a deformable part, the case is hardly moved from the substrate, etc. Further, a small input device is easily configured by reducing the dimension of the case. Moreover, the same input device can be commonly mounted on a plurality of different kinds of substrates.

In the input device according to the first aspect of the invention, preferably, the case has a lower case having a recess, and a lid that covers the recess. The actuating member is inserted into the recess, and the fixed part of the actuating member is fixedly sandwiched between a bottom part of the recess, and the lid.

In this input device, assembling work is easy, and the fixed part of the actuating member can be firmly fixed within the case.

The input device of the invention can be made small, and can also be commonly mounted on a plurality of apparatuses. Further, detecting operation is not performed when locations other than the operating part is touched with a hand. Further, when an operating force acts on the operating part, an excessive force can be prevented from acting on parts fixed to a substrate provided in a keyboard device, etc.

DESCRIPTION OF THE PREFERRED EMBODIMENT

Figure 1:
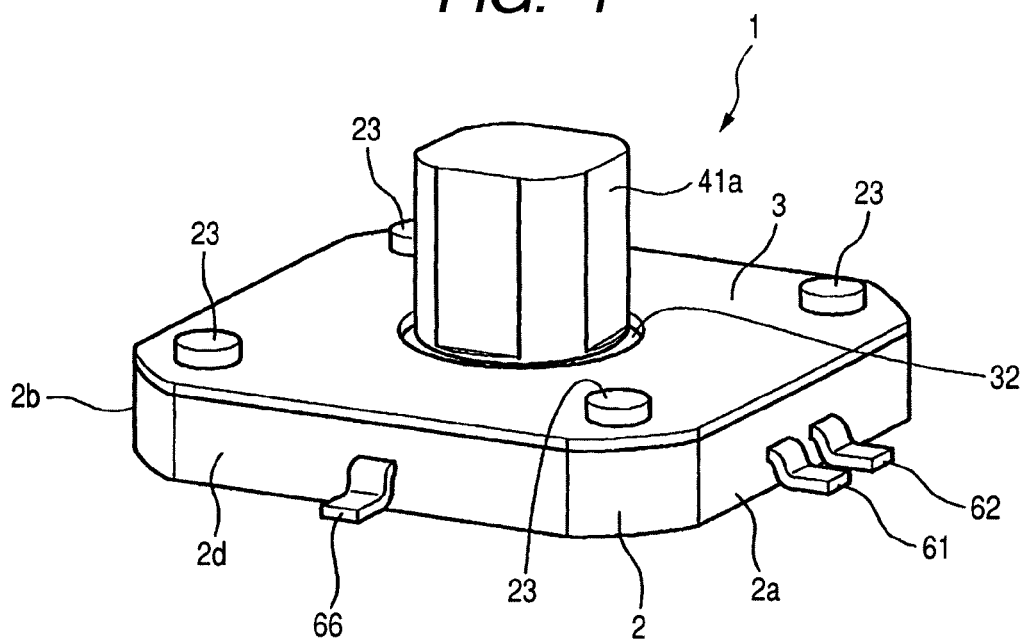
FIG. 1 is a perspective view showing an input device according to a first embodiment.
Figure 2:
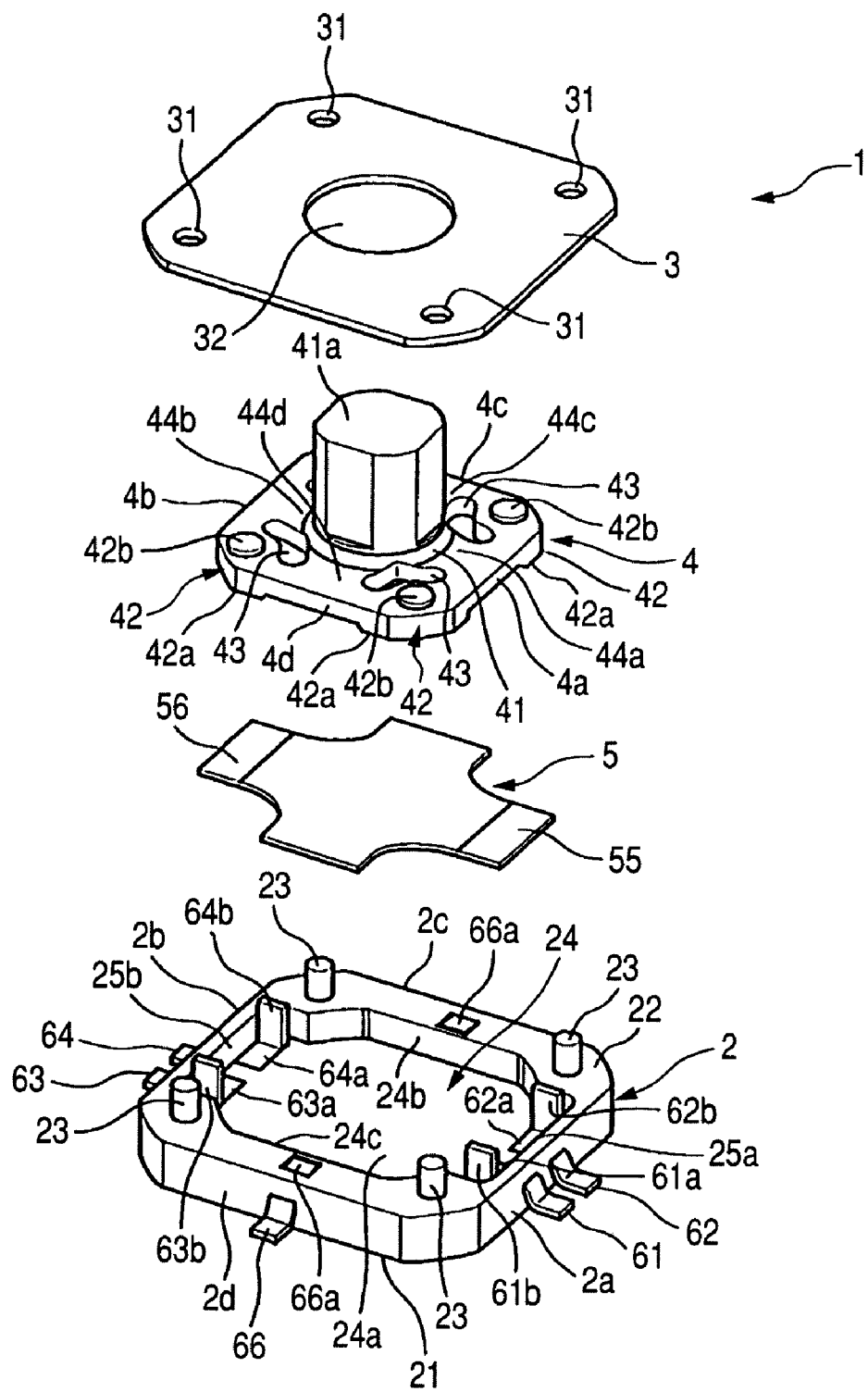
FIG. 2 is an exploded perspective view of the input device according to the first embodiment.
Figure 3:
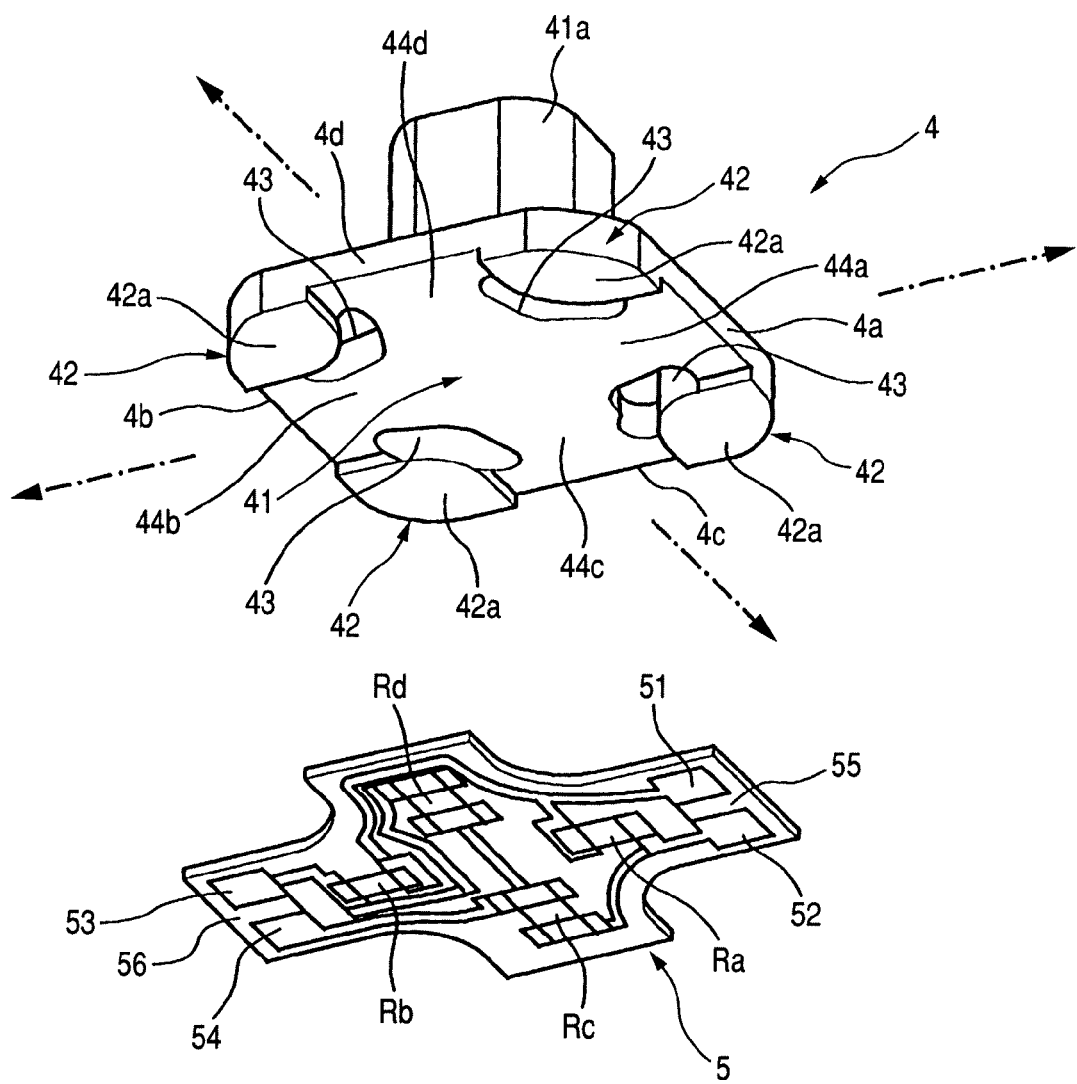
FIG. 3 is a perspective view when an actuating member and a flexible substrate of the input device according to the first embodiment are viewed from the backside.
Figure 5:
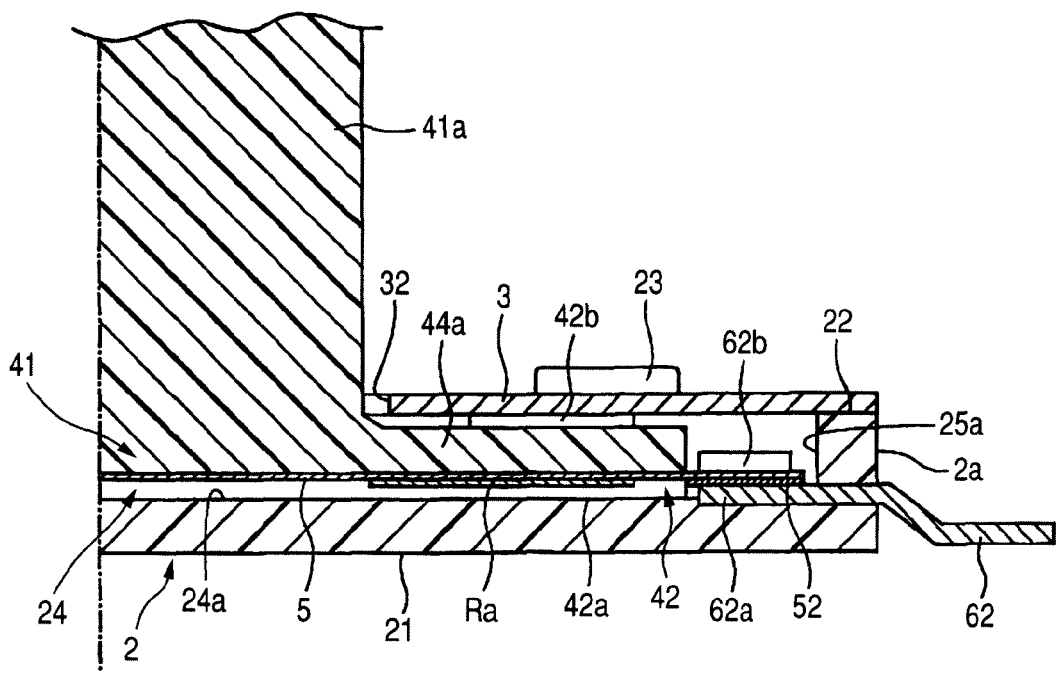
FIG. 5 is a sectional view of the input device according to the first embodiment.
Figure 6:
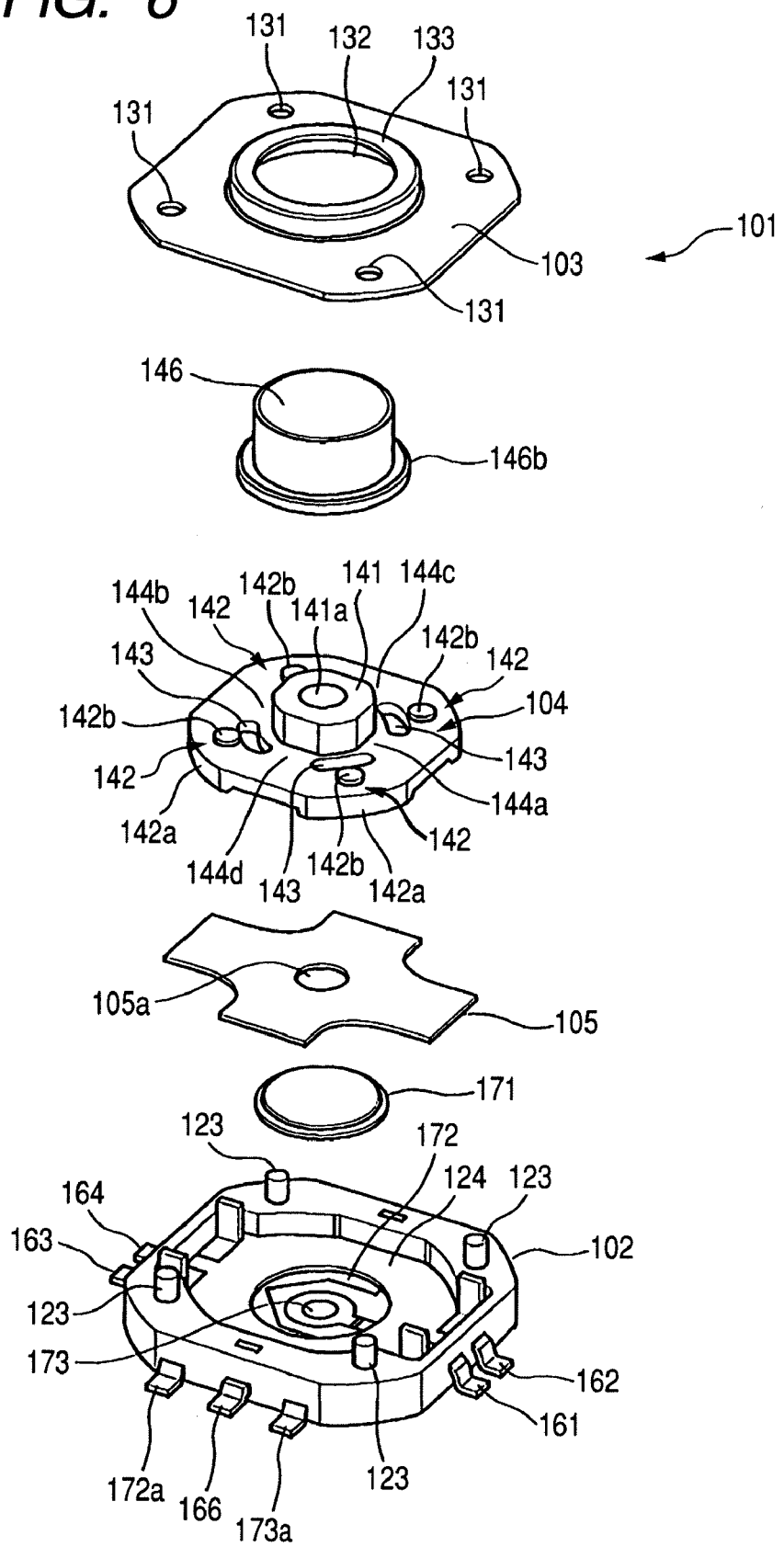
FIG. 6 is an exploded perspective view of an input device according to a second embodiment.

FIG. 1 is a perspective view showing an input device 1 according to a first embodiment, FIG. 2 is an exploded perspective view of the input device 1, FIG. 3 is a perspective view when an actuating member 4 and a flexible substrate 5 are viewed from the backside, FIG. 5 is a circuit diagram of the input device 1, and FIG. 6 is a half sectional view of the input device 1.

As shown in the exploded perspective view of FIG. 2, the input device 1 of the first embodiment has a lower case 2 and a lid 3 that is an upper case, and the lower case 2 and the lid 3 constitute a case. The actuating member 4 and the flexible substrate 5 are received between the lower case 2 and the lid 3.

The lower case 2 is formed of an electrically insulating synthetic resin material. As shown in FIGS. 2 and 5, the lower surface 21 and upper surface 22 of the lower case 2 are planes, and the lower surface 21 and the upper surface 22 are parallel to each other. Further, a first outer side surface 2a and a second outer side surface 2b are planes parallel to each other, and a third outer side surface 2c and a fourth outer side surface 2d are planes parallel to each other. The first outer side surface 2a and the second outer side surface 2b are orthogonal to each other, and the third outer side surface 2c and the fourth outer side surface 2d are orthogonal to each other. Consequently, the lower case 2 is substantially square in plan view, and is of a thin type whose height is smaller than its width. In addition, projections for positioning the input device 1 may be formed integrally on the lower surface 21 of the lower case 2.

Projections 23 for fixing the lid 3 are provided at four corners of the upper surface 22 of the lower case 2. Each of the projections 23 is cylindrical, and is formed integrally with the lower case 2 of synthetic resin.

A bottomed recess 24 that is open to the upper surface 22 is formed in the lower case 2. The recess 24 is a receiving region where a central region that is surrounded by an inner side surface 24b and an inner side surface 24c, which face each other parallel to each other, and a bottom surface 24a, receives the actuating member 4. Further, the recess 24 has a holding region 25a extending towards the first outer side surface 2a from the receiving region, and a holding region 25b extending towards the second outer side surface 2b from the receiving region. The bottom surface 24a is a plane that continues towards the holding region 25a and the holding region 25b from the receiving region.

Connecting terminals 61, 62, 63, and 64 are attached to the lower case 2. These connecting terminals 61, 62, 63, and 64 are inserted when the lower case 2 is molded.

The connecting terminals 61, 62, 63, and 64 are formed of a conductive metal plate. The connecting terminals 61 and 62 has, in the holding region 25a, connecting pieces 61a and 62a that are exposed at almost the same surface as the bottom surface 24a of the recess 24, and clamping pieces 61b and 62b that are vertically bent from the connecting pieces 61a and 62a. The connecting terminals 63 and 64 has, in the holding region 25b, connecting pieces 63a and 64a that are exposed at almost the same surface as the bottom surface 24a of the recess 24, and clamping pieces 63b and 64b that are vertically bent from the connecting pieces 63a and 64a.

Further, FG terminals 66 and 66 are inserted into the lower case 2. These FG terminals 66 and 66 are provided for a countermeasure against static electricity, and portions 66a and 66a thereof are exposed to the upper surface 22 of the lower case 2.

The lid 3 is a metal plate and its shape corresponds approximately to the shape of the lower case 2 in plan view. Fixing holes 31 are formed in the positions of the lid 3 corresponding to the projections 23 formed in four places of the lower case 2. Further, an operation hole 32 is formed in the center of the lid 3.

The actuating member 4 is integrally formed of a synthetic resin material. As shown in FIGS. 2, 3, and 5, the actuating member 4 is substantially square in plan view, and has side surfaces 4a and 4b that face each other, and side surfaces 4c and 4d that face each other. The spacing between the side surface 4c and the side surface 4d is almost the same as the spacing between the inner side surface 24b and inner side surface 24c of the recess 24 of the lower case 2, and the actuating member 4 is held without movement in the receiving region of the recess 24.

In FIG. 3, an axis passing through a midpoint between the side surface 4c and side surface 4d of the actuating member 4, and parallel to the side surface 4c and the side surface 4d is shown as the X-axis, and an axis passing through a midpoint between the side surface 4a and side surface 4b of the actuating member 4, and parallel to the side surface 4a and the side surface 4b is shown as the Y-axis.

The central part of the actuating member 4 is an operating part 41, and an operating knob 41a that extends upward is formed integrally on the operating part 41. The four corners of the actuating member 4 are fixed parts 42. The fixed parts 42 are disposed at a distance from each other on both sides of the X-axis, and the fixed parts 42 are disposed at a distance for each other on both sides of the Y-axis. As shown in FIG. 3, lower supporting surfaces 42a are formed integrally on the fixed parts 42, respectively, so as to project with a height difference from the rear side thereof. The lower supporting surfaces 42a are located on the same plane. As shown in FIG. 2, upper supporting surfaces 42b are formed integrally on the fixed parts 42, respectively, so as to project with a height difference from the front side thereof. The lower supporting surfaces 42b are located on the same plane.

Cutout parts 43 are formed in four places of the actuating member 4. The cutout parts 43 are through-holes that pass vertically through the actuating member 4. Each of the cutout parts 43 is formed between each of the fixed parts 42 and the operating part 41. That is, the cutout parts 43 are formed at a distance from each other on both sides of the X-axis, and are formed at a distance from each other on both sides of the Y-axis.

As shown in FIG. 3, a first X-direction deformable part 44a is formed in a region sandwiched between the cutout parts 43 inside the side surface 4b in the actuating member 4, and a second X-direction deformable part 44b is formed in a region sandwiched between the cutout parts 43 inside the side surface 4a. A first Y-direction deformable part 44c is formed in a region sandwiched between the cutout parts 43 inside the side surface 4c, and a second Y-direction deformable part 44d is formed in a region sandwiched between the cutout parts 43 inside the side surface 4d.

The thickness of the actuating member 4 is constant in places other than the operating part 41 and the four fixed parts 42. Consequently, each of the deformable parts 44a, 44b, 44c, and 44d has a width smaller than each of the fixed parts 42. Further, the thickness from the first X-direction deformable part 44a to the side surface 4a is uniform on the X-axis, and the thickness from the second X-direction deformable part 44b to the side surface 4b is constant on the X-axis. The thickness from the first Y-direction deformable part 44c to the side surface 4c is uniform on the Y-axis, and the thickness from the second Y-direction deformable part 44b to the side surface 4d is constant on the X-axis.

The flexible substrate 5 is fixedly bonded to the rear surface of the actuating member 4. In this regard, the flexible substrate 5 is fixedly bonded to the portions except the four lower supporting surfaces 42a, on the rear surface of the actuating member 4.

Strain detecting elements Ra, Rb, Rc, and Rd are fixed and mounted on the rear surface of the flexible substrate 5. These strain detecting elements Ra, Rb, Rc, and Rd change in electric resistance according to the amount of strain in an expansion direction. The strain detecting element Ra is attached to the rear surface of the first X-direction deformable part 44a. Similarly, the strain detecting elements Rb, Rc, and Rd are attached to the rear surfaces of the second X-direction deformable part 44b, the first Y-direction deformable part 44c, and the second Y-direction deformable part 44d, respectively. If the strain detecting element Ra is attached to the rear surface of the first X-direction deformable part 44a in a position where it is slightly deviated towards the side surface 4a, the deformation amount of the first X-direction deformable part 44a can be effectively detected. This is also the same in the strain detecting elements Rb, Rc, and Rd.

Figure 4:
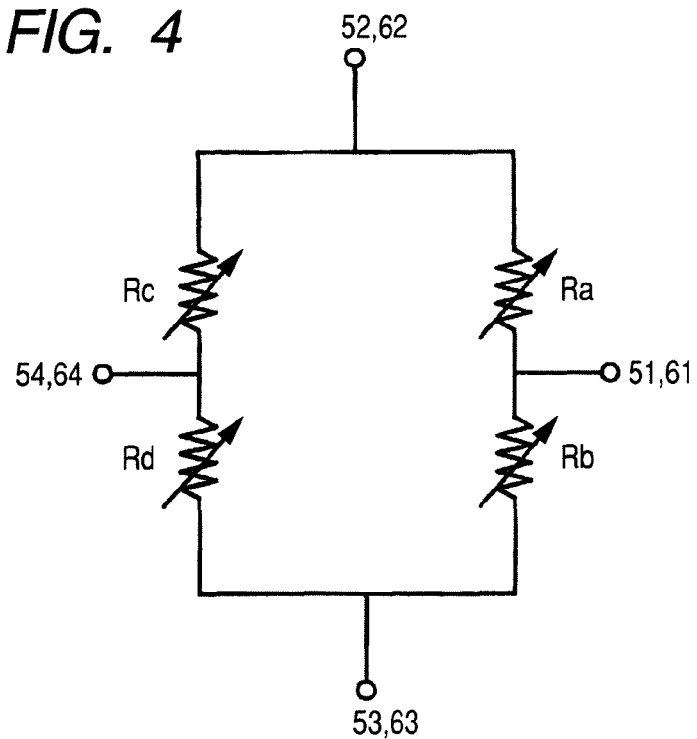
FIG. 4 is a diagram showing a circuit configuration of the input device.

As shown in FIG. 3, a protruding part 55 that protrudes from the side surface 4a of the actuating member 4 is formed on the flexible substrate 5, and a pair of conductive lands 51 and 52 are exposed to the protruding part 55. Similarly, a protruding part 56 that protrudes from the side surface 4b of the actuating member 4 is formed on the flexible substrate 5, and a pair of conductive lands 53 and 54 are exposed to the protruding part 56. Conductive patterns that electrically connect the lands 51, 52, 53, and 54 with the strain detecting elements Ra, Rb, Rc, and the Rd, respectively, are formed on the surface of the flexible substrate 5. A circuit that is configured on the flexible substrate 5 is as shown in FIG. 4.

A method of assembling the above input device 1 receives the actuating member 4 in the recess 24 of the lower case 2, after the flexible substrate 5 is stuck on the rear surface of the actuating member 4. At this time, the land 51 formed in the flexible substrate 5 is made to face the connecting piece 62a of the connecting terminal 61, and the land 52 of the flexible substrate 5 is made to face the connecting piece 61a of the connecting terminal 62. Similarly, the lands 53 and 54 formed in the flexible substrate 5 are made to face the connecting pieces 63a and 64a of the connecting terminals 63 and 64, respectively. Furthermore, the clamping piece 61b of the connecting terminal 61 and the clamping piece 62b of the connecting terminal 62 are bent, thereby holding the protruding part 55 of the flexible substrate 5, and electrically connecting the lands 51 and 52 with the connecting pieces 61a and 62a. Similarly, the clamping piece 63b of the connecting terminal 63 and the clamping piece 64b of the connecting terminal 64 are bent, thereby holding the protruding part 56 of the flexible substrate 56, and electrically connecting the lands 53 and 54 with the connecting pieces 63a and 64a.

Thereafter, the lid 3 is fixed to the lower case 2 by putting the lid 3 on the lower case 2, inserting the projections 23 provided in the lower case 2 into the fixing holes 31 of the lid 3, respectively, and heating, pressing, and crushing the tips of the projections 23.

At this time, the lid 3 is closely fixed to the upper surface 22 of the lower case 2. Accordingly, as shown in FIG. 5, the lower supporting surfaces 42a formed so as to project from the lower surfaces of the fixed parts 42 of the actuating member 4 are pressed against the bottom surface 24a of the recess 24 of the lower case 2, and the lid 3 is pressed against the upper supporting surfaces 42b formed so as to project from the upper surfaces of the fixed parts 42 of the actuating member 4. The actuating member 4 is fixed such that the fixed parts 42 provided at four corners are sandwiched and are not be moved by the bottom surface 24a of the lower case 2 and the lid 3. On the other hand, the deformable parts 44a, 44b, 44c, and 44d are apart from the bottom surface 24a of the recess 24 of the lower case 2, and are also apart from the lid 3. Consequently, the deformable parts 44a, 44b, 44c, and 44d are deformable within the case. Further, as shown in FIG. 5, the operating knob 41a provided in the operating part 41 is located at a distance from the inner peripheral edge of the operation hole 32 of the lid 3, and the operating knob 41a can be operated so as to be tilted.

In this input device 1, a power supply voltage is applied to the connecting terminal 62 and the land 52, and the connecting terminal 63 and the land 53 are set to grounding potential. Further, the FG terminals 66 and 66 are connected to a grounding part on the side of the main body of an apparatus on which this input device 1 is to be loaded. When the operating knob 41a is tilted towards the first outer side surface 2a of the lower case 2, or towards the second outer side surface 2b, the first X-direction deformable part 44a and the second X-direction deformable part 44b deform, and the resistance values of the strain detecting elements Ra and Rb attached to these parts, respectively, change. As a result, the potential of a midpoint between the strain detecting element Ra and the strain detecting element Rb shown in the circuit diagram of FIG. 4 changes, and this potential change potential is output via the connecting terminal 61 from the land 51.

Further, when the operating knob 41a is tilted towards the third outer side surface 2c of the lower case 2, or towards the fourth outer side surface 2d, the first Y-direction deformable part 44c and the second Y-direction deformable part 44d deform, and the resistance values of the strain detecting elements Rc and Rd attached to these parts, respectively, change. Consequently, the potential of a midpoint between the strain detecting element Rc and the strain detecting element Rd changes, and this potential change is output via the connecting terminal 64 from the land 54.

As shown in FIG. 5, in this input device 1, the deformable parts 44a, 44b, 44c, and 44d provided in the actuating member 4 are thinner than the fixed parts 42 provided at four corners. Therefore, when the operating knob 41a is operated, the deformable parts 44a, 44b, 44c, and 44d deform easily. As shown in FIG. 3, both sides of the first X-direction deformable part 44a are sandwiched between the cutout parts 43 and 43, and the first X-direction deformable part 44a is made thinner than the fixed parts 42, and the same thickness is given towards the side surface 4a of the actuating member 4 from the first X-direction deformable part 44a. Therefore, the deformation amount when the operating knob 41a is operated can be secured much. This is also the same in the second X-direction deformable part 44b, the first Y-direction deformable part 44c, and the second Y-direction deformable parts 44d.

Therefore, when an operating force is applied to the operating knob 41a, a high-sensitive detection output can be obtained from the connecting terminals 61 and 64.

In addition, although the present embodiment has been described that the fixed parts 42 are provided at four corners of the actuating member 4, the fixed parts 42 may be continuously formed at the whole outer periphery of the actuating member.

Since this input device 1 is configured within a range of the size of the lower case 2, the whole input device is small and thin. This input device 1 can be mounted by soldering the connecting terminals 61, 62, 63, and 64 and the FG terminals 66 and 66 to conductive patterns formed on a substrate of a keyboard device, etc. As mentioned above, when the operating knob 41a is operated so as to be tilted, stress concentratingly acts on the deformable parts 44a, 44b, 44c, and 44d of the actuating member 4 provided within the case. Therefore, a large stress does not act on soldered parts between the connecting terminals 61, 62, 63, and 64 extending from the case and the substrate. Consequently, the soldered parts can be prevented from being broken by an operating force that operates the operating knob 41a.

Figure 7:
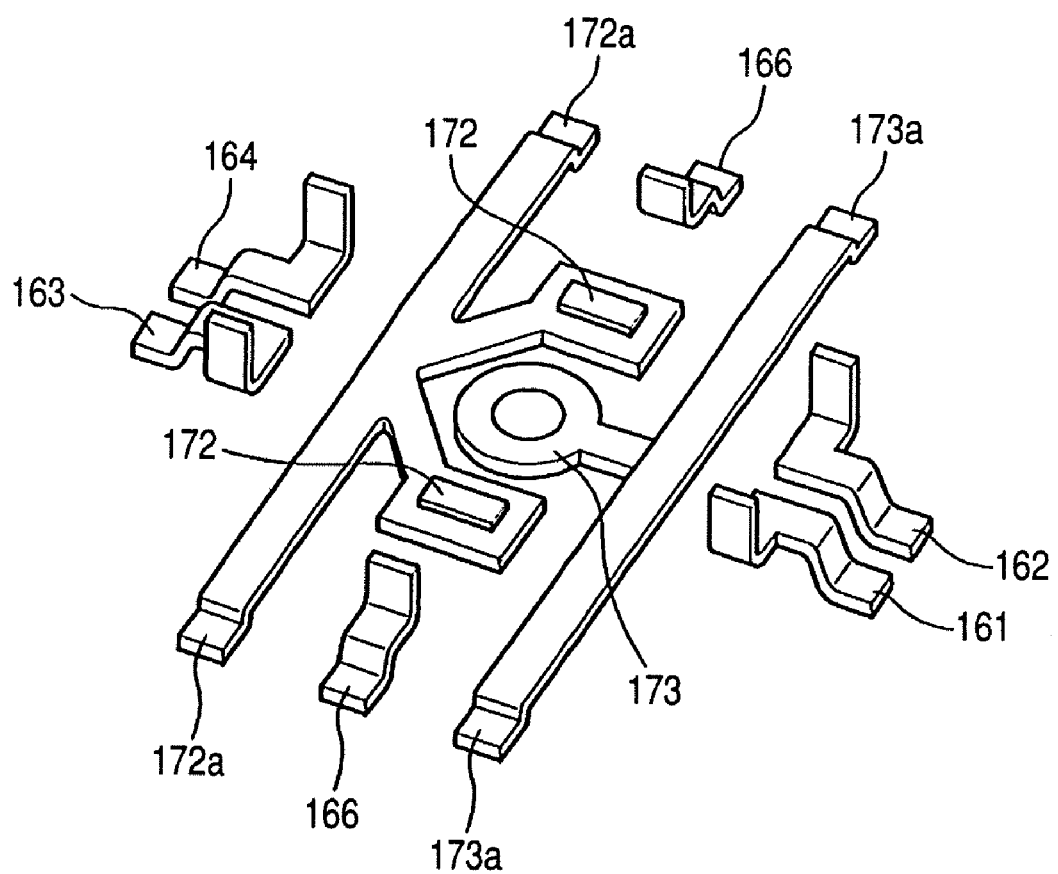
FIG. 7 is a perspective view of terminals buried in a lower case of the second embodiment.
Figure 8A:
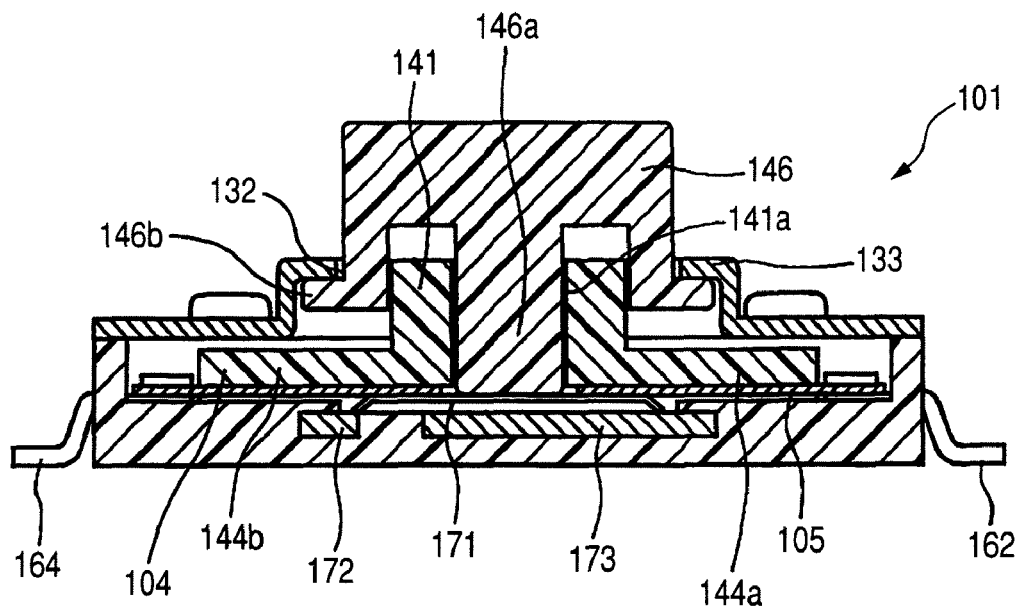
FIGS. 8A and 8B are sectional views showing the input device according to the second embodiment according to operation.
Figure 8B:
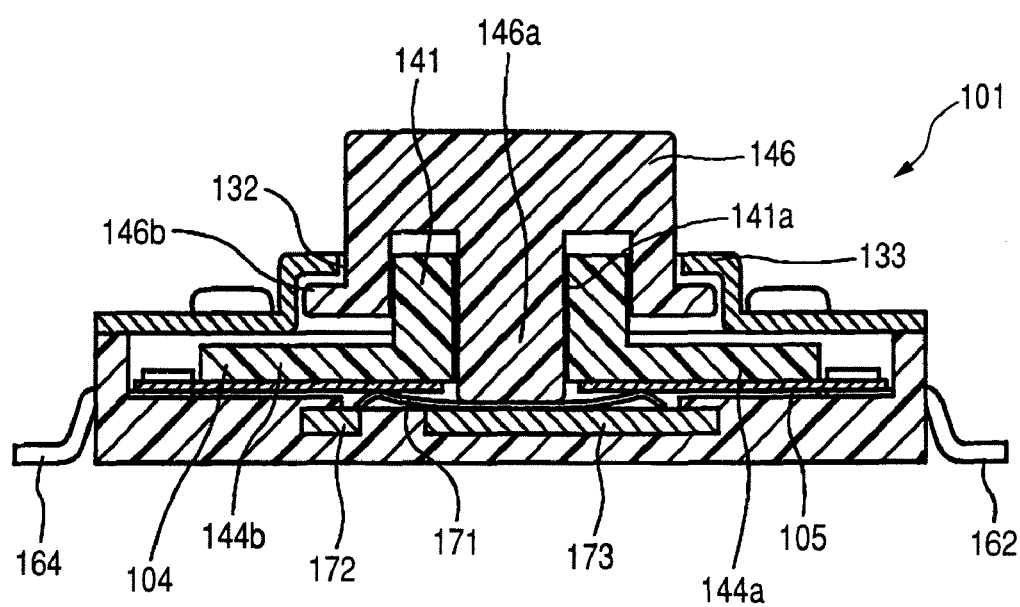

FIG. 6 is a perspective view showing an input device 101 according to a second embodiment, FIG. 7 is a perspective view connecting terminals attached to a lower case of the input device 101, and FIGS. 8A and 8B are sectional views according to the operation of the input device 101.

As shown in FIG. 6, the input device 101 of the second embodiment can obtain a detection output as the deformable parts 144a, 144b, 144c, and 144d of the actuating member 104 deform, and this principle of operation is the same as that of the input device 1 of the first embodiment.

As shown in FIG. 6, the input device 101 has a lower case 102, and a recess 124 is formed in the lower case 102. Projections 123 are integrally formed at four corners of the upper surface of the lower case 102, respectively, and the projections 123 are respectively inserted into connecting holes 131 formed in the lid 103, thereby fixing the lower case 102 and the lid 103.

The actuating member 104 is received in the recess 124 of the lower case 102. The central part of the actuating member 104 is formed with an operating part 141, similarly to the actuating member 4 of the first embodiment, and fixed parts 142 are provided at four corners outside the operating part. Lower supporting surfaces 142a and upper supporting surfaces 142b are formed in the fixed parts 142, respectively. Also, the lower supporting surfaces 142a and the upper supporting surfaces 142b are sandwiched and fixed between the bottom surface of the recess 124 of the lower case 102, and the lid 103.

Cutout parts 143 are respectively formed inside the fixed parts 142 of the actuating member 104, and four deformable parts 144a, 144b, 144c, and 144d are integrally formed in the parts sandwiched between the cutout parts 143.

The operating part 141 that projects upward is integrally formed on the central part of the actuating member 104, and a sliding hole 141a is formed in the center of the operating part 141 so as to pass vertically through the operating part. In the present embodiment, an operating knob 146 is formed as a member separate from the actuating member 104. As shown in FIG. 6 and FIGS. 8A, and 8B, the operating knob 146 is located inside an operation hole 132 of the lid 103, and a flange part 146b formed at the outer periphery of a base of the operating knob 146 is located in a raised part 133 of the central part of the lid 103. Further, the operating knob 146 is slidably attached to an outer peripheral part of the operating part 141 of the actuating member 104, and a pressing projection 146a formed in the center of the operating knob 146 is slidably inserted into the sliding hole 141a of the actuating member 104.

A flexible substrate 105 shown in FIG. 6 is bonded to the rear surface of the actuating member 104, and the same strain detecting elements Ra, Rb, Rc, and Rd as those shown in FIG. 3 are mounted on the flexible substrate 105. The strain detecting elements Ra, Rb, Rc, and Rd are respectively attached to the lower surfaces of the deformable parts 144a, 144b, 144c and 144d of the actuating member 104.

A hole 105a is formed in the central part of the flexible substrate 105, and the pressing projection 146a formed in the operating knob 146 passes through the hole 105a.

In this input device 101, a switch mechanism is provided at the bottom part of the recess 124 of the lower case 102. This switch mechanism has an inverting plate 171 formed in the shape of a dome from a plate material having conductivity and a spring property. Further, an outer electrode 172 and an inner electrode 173 are provided on the bottom surface of the recess 124 of the lower case 102, and the outer peripheral edge of the inverting plate 171 is electrically connected to the outer electrode 172.

As shown in FIG. 7, within the lower case 102, a switch terminal 172a integral with the outer electrode 172, and a switch terminal 173a integral with the inner electrode 173 are buried. The switch terminals 172a and 173a project outward from a side surface of the lower case 102.

As shown in FIG. 7, connecting terminals 161, 162, 163, and 164 are buried in the lower case 102, and these are the same as the connecting terminals 61, 62, 63, and 64 provided in the input device 1 of the first embodiment. Further, FG terminals 166 and 166 shown in FIG. 7 are the same as the FG terminals 66 and 66 of the first embodiment.

In this input device 101, as shown in FIG. 8A, when a pressing force is not applied to the operating knob 146, the operating knob 146 is now pushed up by the elastic force of the inverting plate 171. Further, as shown in FIG. 8B, when the operating knob 146 is pressed, the inverting plate 171 is deformed by the pressing projection 146a formed in the operating knob 146, the central part of the inverting plate 171 abuts on the inner electrode 173, and the outer electrode 172 and the inner electrode 173 are electrically connected to each other.

When the operating knob 146 is tilted with the switch mechanism turned off as shown in FIG. 8A, or with the switch mechanism turned on as shown in FIG. 8B, the deformable parts 144a, 144b, 144c, and 144d of the actuating member 104 deforms, and the midpoint potential of the strain detecting elements Ra and Rb changes, and the midpoint potential of the strain detecting elements Rc and Rd changes.

Even in this input device 101, the fixed parts 142 provided at four corners of the actuating member 104 are fixedly sandwiched between the bottom surface of the recess 124 of the lower case 102, and the lid 103, and when the operating knob 146 is operated, the deformable parts 144a, 144b, 144c, and 144d deforms within the case. Consequently, when an operating force is applied to the operating knob 146, an excessive force can be prevented from acting on a soldered part between each of the connecting terminals 161, 162, 163, and 164, etc. and a conductive pattern of a substrate.

Further, when the operating knob 146 has been tilted with the switch mechanism turned off as shown in FIG. 8A, and when the operating knob 146 has been tilted with the switch mechanism turned on as shown in FIG. 8B, separate input signals can be generated.

Figure 9:
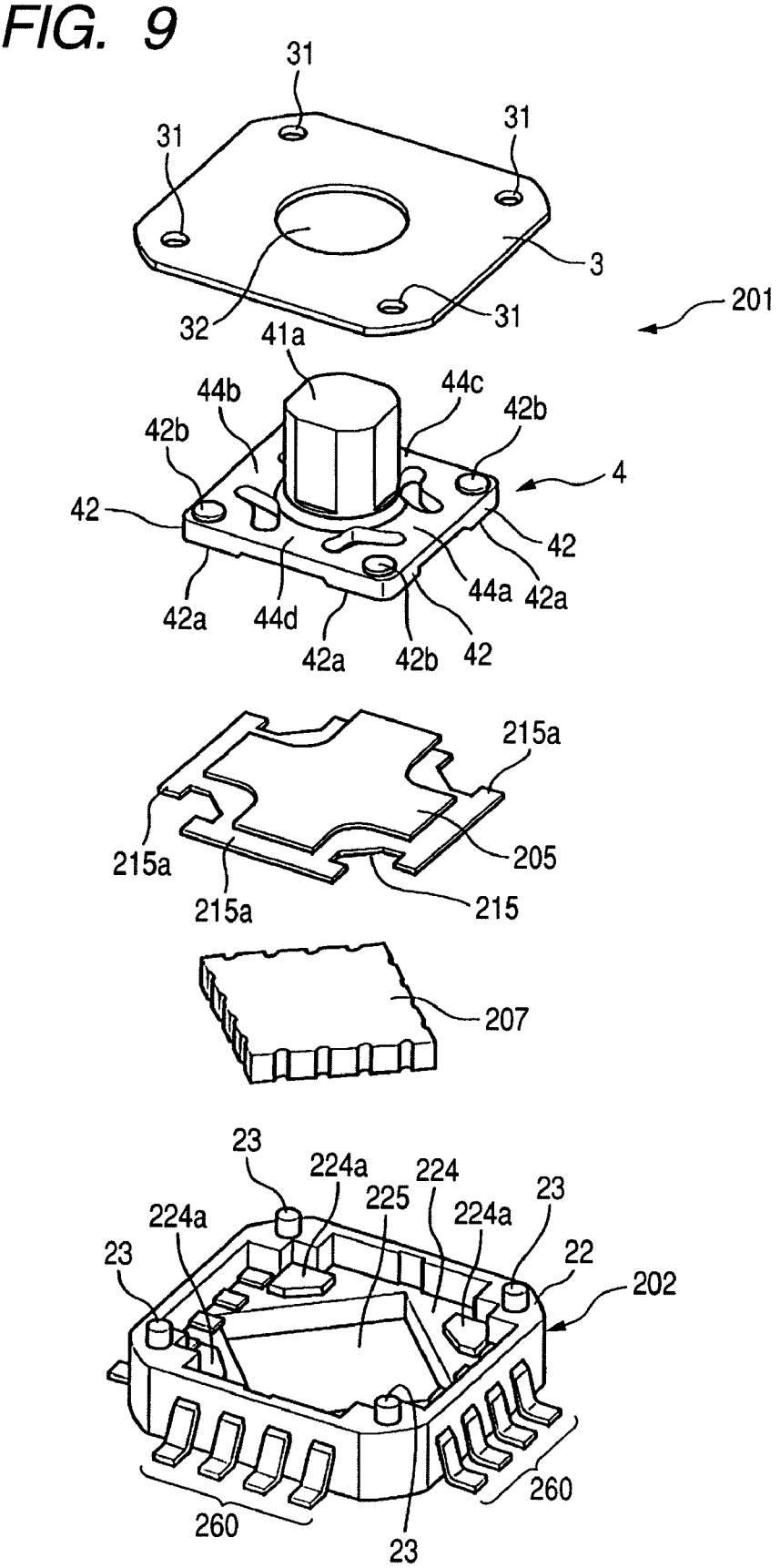
FIG. 9 is an exploded perspective view of an input device according to a third embodiment.
Figure 10:
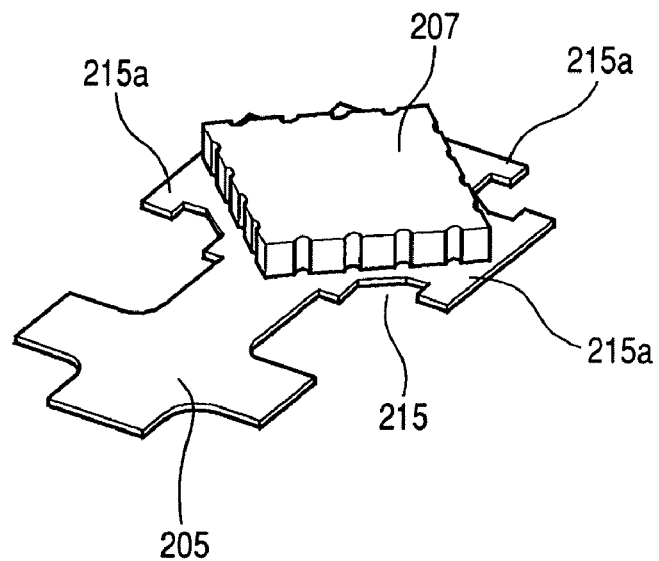
FIG. 10 is a perspective view showing a circuit unit and a flexible substrate that are provided in the input device according to the third embodiment.
Figure 11:
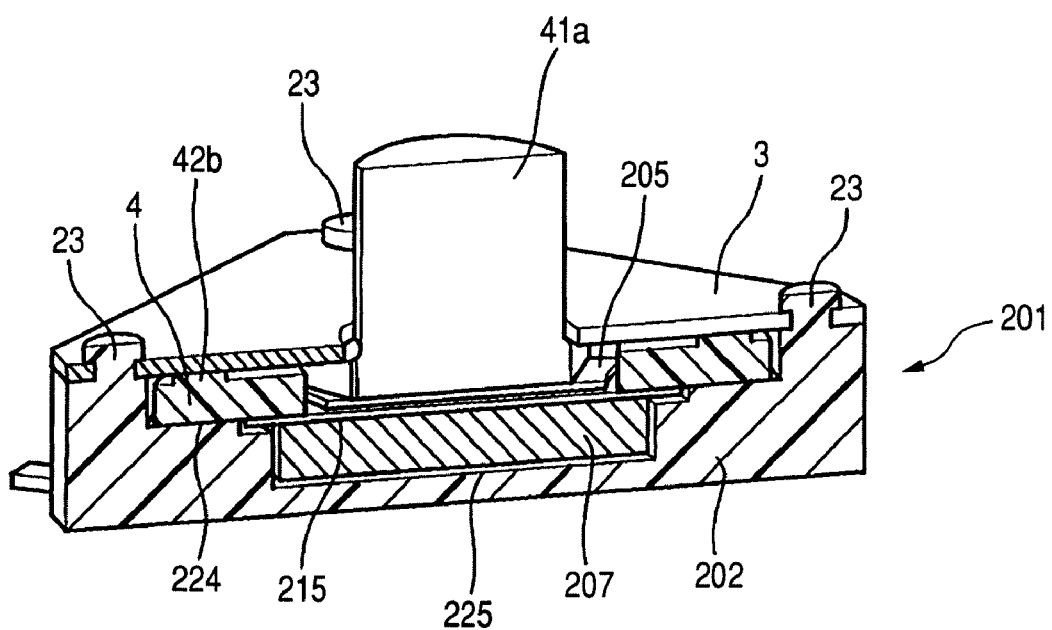
FIG. 11 is a sectional perspective view showing the input device according to the third embodiment.

FIG. 9 is an exploded perspective view showing an input device 201 according to a third embodiment, FIG. 10 is a perspective view showing a circuit unit and a flexible substrate, and FIG. 11 is a sectional view of the input device 201.

In the input device 201 of the third embodiment, the same elements as those of the input device 1 of the first embodiment are denoted by the same reference numerals, and detailed description thereof is omitted herein.

As shown in FIG. 9 and FIG. 11, the height of a lower case 202 is slightly greater than that of the lower case 2 of the first embodiment. Projections 23 are integrally formed at four corners of the upper surface of the lower case 202, respectively, and the projections 23 are respectively inserted into connecting holes 31 in the lid 3, thereby fixing the lower case 202 and the lid 3.

A first recess 224 is formed in the lower case 202, and supporting bases 224a are integrally formed at the four corners of the bottom part of the first recess 224 so as to project therefrom. The actuating member 4 is received in the first recess 224 of the lower case 202. In this case, the lower supporting surfaces 42a that project from the lower surfaces of the fixed parts 42 of the actuating member 4 are installed on the supporting bases 224a, respectively. Also, the upper supporting surfaces 42b that project from the upper surfaces of the fixed parts 42 are pressed by the lid 3. Accordingly, the actuating member 4 is securely fixed within the case, and the fixed parts 42 of the four corners are sandwiched from above and below.

A second recess 225 formed more deeply than the first recess 224 is provided inside the first recess 224 in the lower case 202. A circuit unit 207 is received in the second recess 225. This circuit unit 207 is an integrated circuit device in which active elements, etc. are formed on each surface of a multilayer substrate. The circuit unit 207 is square, the second recess 225 is also square, and the circuit unit 207 is received in the second recess 225 without movement.

A flexible substrate 205 is bonded to the lower surface of the actuating member 4. The strain detecting elements Ra, Rb, Rc, and Rd shown in FIG. 3 are mounted on the surface of the flexible substrate 205 opposite to its surface bonded to the actuating member 4, and the strain detecting elements Ra, Rb, Rc, and Rd are attached to the lower surfaces of the deformable parts 44a, 44b, 44c, and 44d of the actuating member 4, respectively.

As shown in FIG. 10, an extension substrate 215 formed integrally from the same flexible substrate is provided in the flexible substrate 205. Also, the circuit unit 207 is mounted on the extension substrate 215. As shown in FIG. 9, the flexible substrate 205 being fixedly bonded to the lower surface of the actuating member 4, the extension substrate 215 is folded so as to be inverted by 180 degrees and overlap the flexible substrate 205. As a result, the circuit unit 207 can be received in the second recess 225.

Connector parts 215a extending in three directions are provided in the extension substrate 215. Conductive patterns are formed on the extension substrate 215, and electrodes of the circuit unit 207 are electrically connected to lands of the connector parts 215a via the conductive patterns. Also, a plurality of connecting terminals 260 provided in the lower case 202 are connected to the lands, respectively, by soldering, etc.

A circuit that detects the midpoint potential of the strain detecting elements Ra and Rb of the circuit diagram of FIG. 4 to adopt a change in the potential as an X-coordinate output, a circuit that detects the midpoint potential of the strain detecting element Rc and Rd to adopt a change in the potential as a Y-coordinate output, a circuit including an interface that communicates with a host-side apparatus, such as a personal computer, etc. is received in the circuit unit 207. Consequently, when the input device 201 shown in FIGS. 9 to 11 is mounted on a keyboard device, etc., data equivalent to the output data of a mouse, including X-Y coordinate data, can be output from each of the connecting terminals 260 of the input device 201. Otherwise, the output of the input device 201 can be converted into the data equivalent to the output data of a mouse by the circuit unit 207 and a driver installed in the personal computer.

Figure 12:
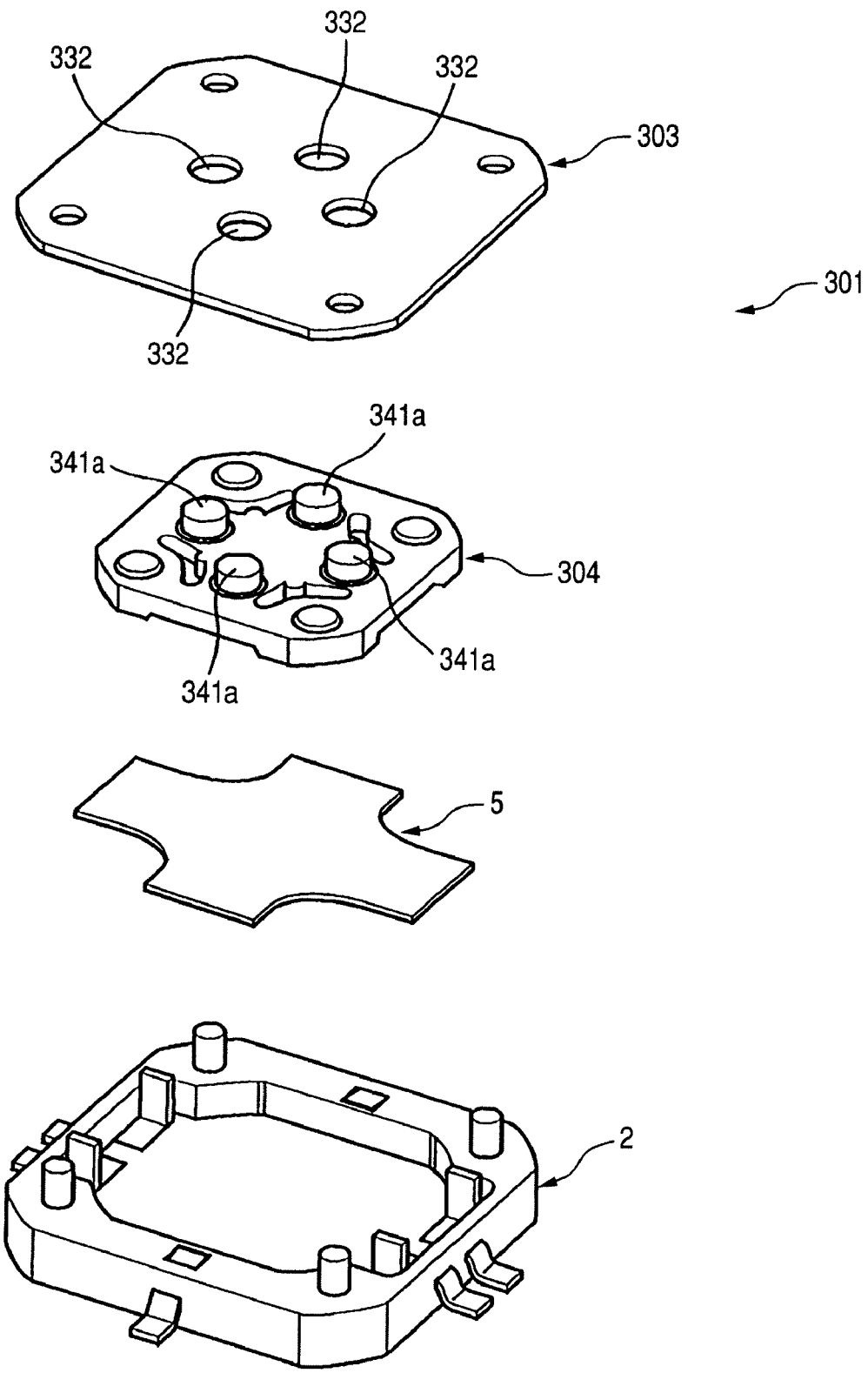
FIG. 12 is an exploded perspective view of an input device according to a fourth embodiment.

FIG. 12 is a perspective view showing an input device 301 according to a fourth embodiment.

In this input device 301, operating projections 341a are integrally formed in four places of the upper surface of the actuating member 304, and the operating projections 341a project upwards from four corresponding operation holes 332 formed in the lid 303. In the actuating member 304, the operating projections 341a are formed on the deformable parts, and when one of the operating projections 341a is pressed, a deformable part the projection deforms. This deformation is detected by a strain detecting element.

Next, fifth and sixth embodiments will be described.

Figure 13:
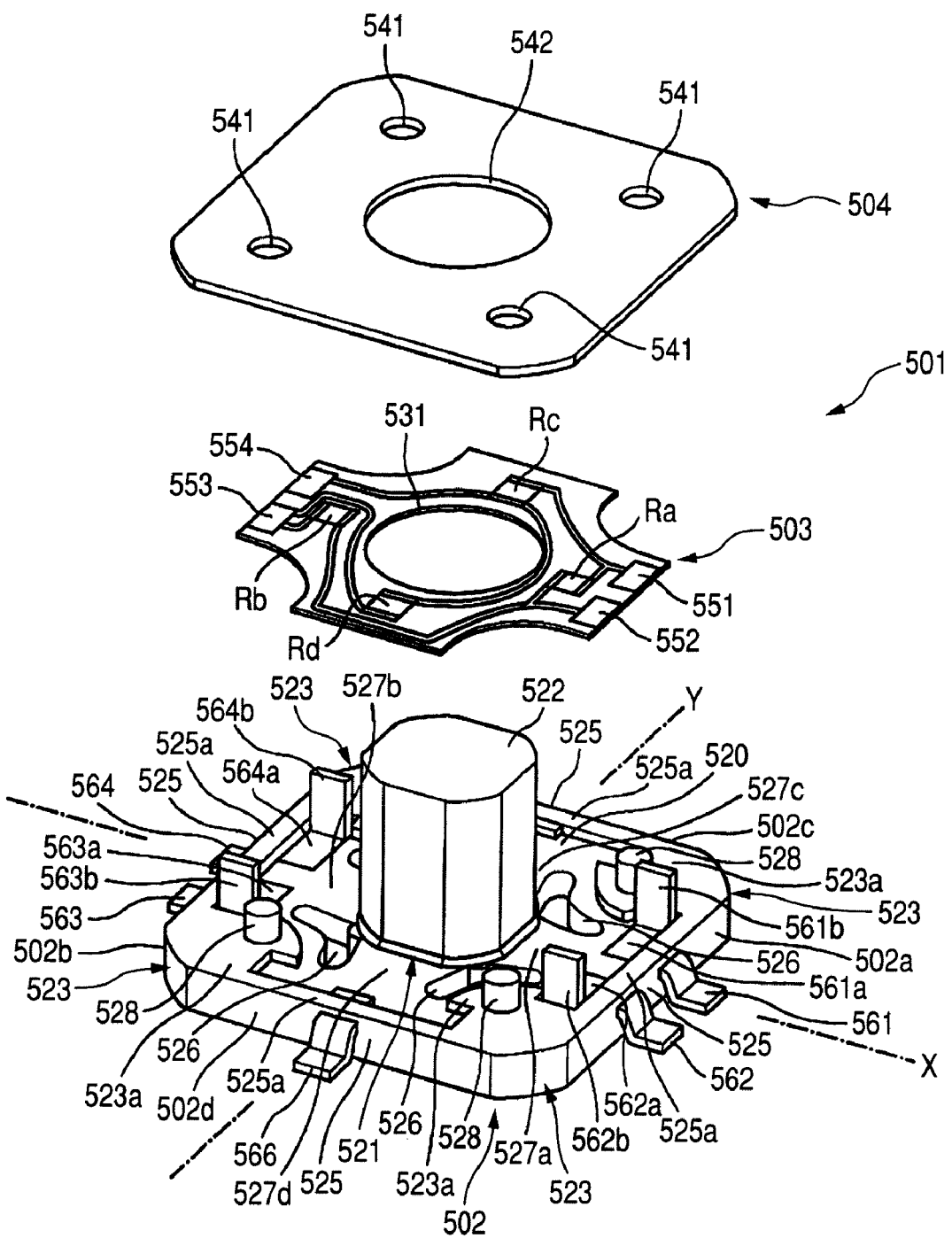
FIG. 13 is an exploded perspective view showing an input device according to a fifth embodiment.
Figure 14:
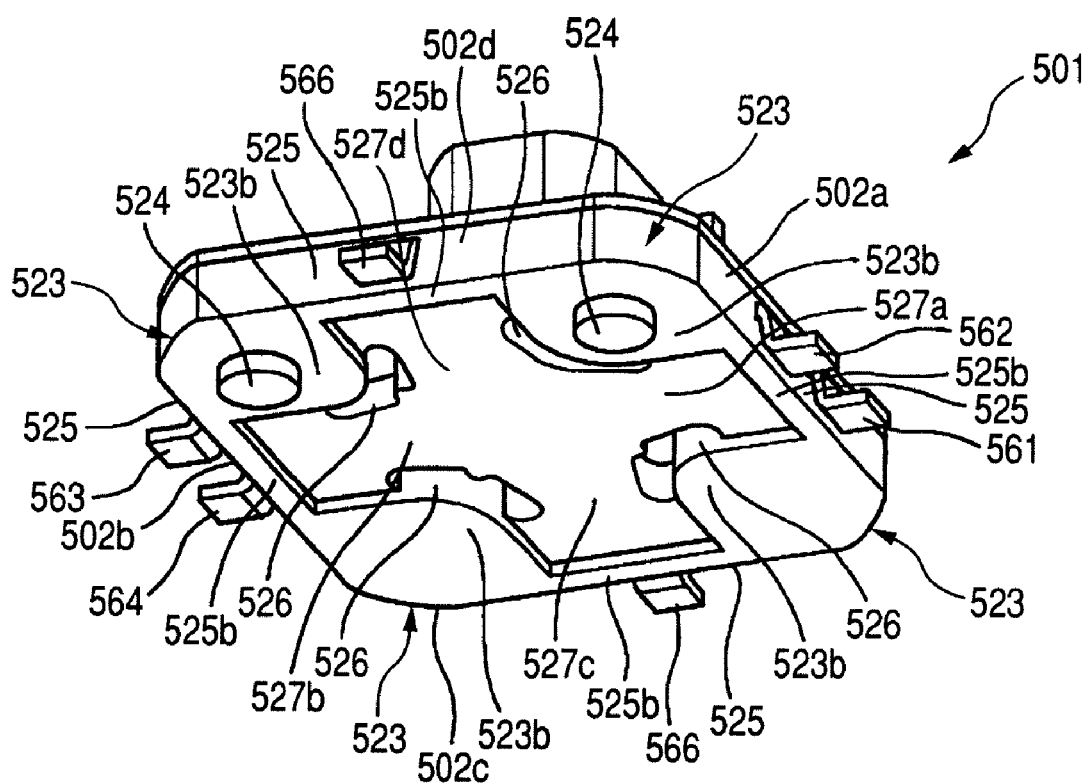
FIG. 14 is an exploded perspective view when the input device according to the fifth embodiment is viewed from the installation surface side.
Figure 15:
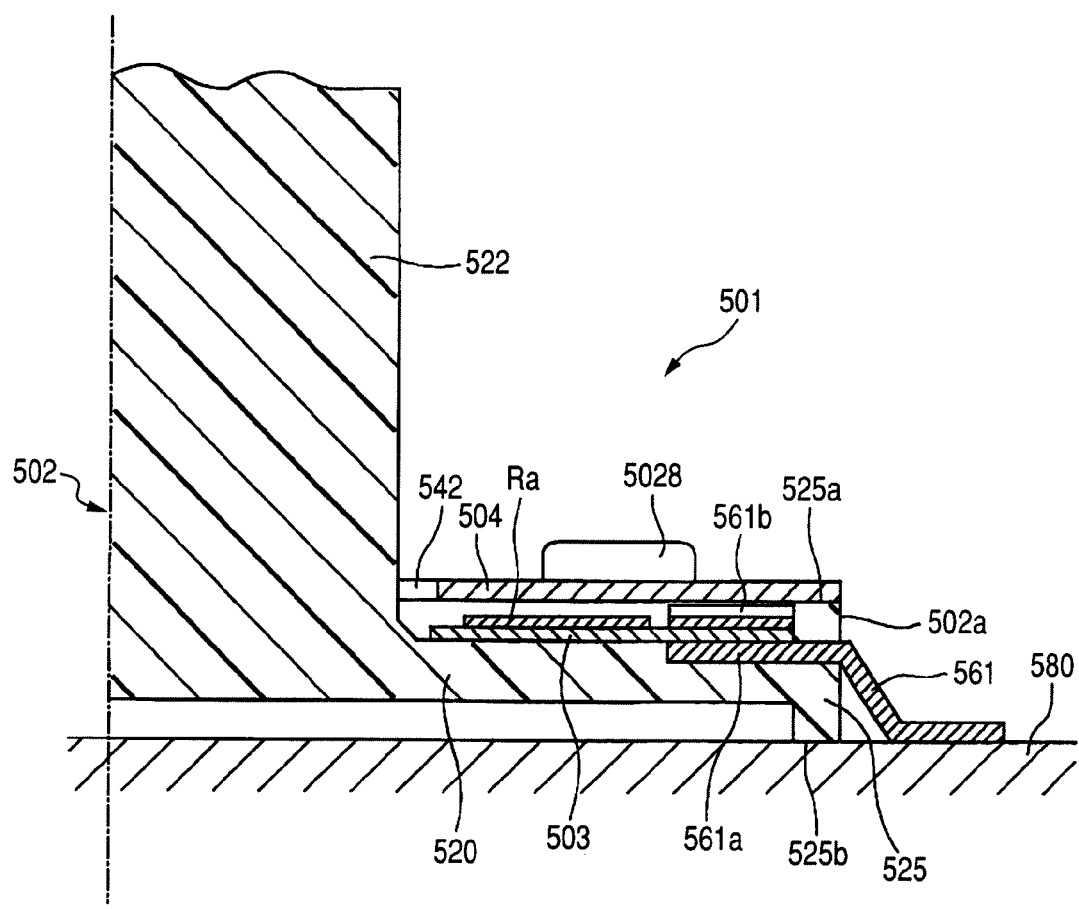
FIG. 15 is a half sectional view of the input device according to the fifth embodiment.

FIG. 13 is an exploded perspective view showing an input device 501 according to a fifth embodiment, FIG. 14 is a perspective view when the input device 501 is viewed from the installation surface side, and FIG. 15 is a half sectional view of the input device 501.

As shown in the exploded perspective view of FIG. 13, the input device 501 has an actuating member 502 that also serves as a case, a flexible substrate 503 attached to an upper part of the actuating member 502, and a lid 504 closely attached to the upper surface of the actuating member 502.

The actuating member 502 is integrally formed of an electrically insulating synthetic resin material. The shape of the actuating member 502 in plan view is substantially square or rectangular. The actuating member 502 is formed with an actuating part 520 having a uniform plate thickness, and the center of the actuating part 520 is provided with an operating part 521. In the operating part 521, an operating knob 522 integral with the actuating part 520 is integrally formed upward.

Four corner parts of the actuating member 502 that are apart from the operating part 521 are fixed parts 523. As shown in FIG. 13, the upper surfaces 523a of the fixed parts 523 are located with a height difference from the upper surface of the actuating part 520, and the four upper surfaces 523a are located on the same plane. As shown in FIG. 14, the lower surfaces (rear surfaces) of the fixed parts 523 are installation surfaces 523b. Four installation surfaces 523b are located on the same plane, and the installation surfaces 523b are located with a height difference from the lower surface of the actuating part 520. As shown in FIG. 14, positioning projections 524 and 524 that integrally project upward are formed in two installation surfaces 523b.

As shown in FIG. 13, in the actuating member 502, wall parts 525 that connect the fixed parts 523 provided at four corners are formed in four places. Also, as shown in FIG. 13, the upper surfaces 523a of the fixed parts 523 and the upper surfaces 525a of the wall parts 525 are located on the same plane. Further, as shown in FIG. 14, the installation surfaces 523b that are the lower surfaces of the fixed parts 523, and lower surfaces 525b of the wall parts 525 are located on the same plane.

Consequently, a part of the actuating member 502 around the operating part 521 is the actuating part 520 that is relatively thin, and an outer peripheral contour part of the actuating member is made larger in thickness than the actuating part 520 over its whole periphery. Also, the actuating member has a first side surface 502a and a second side surface 502b that are parallel to each other, and has a third side surface 502c and a fourth side surface 502d that are parallel to each other. The first outer side surface 502a and the second outer side surface 502b are planes that are orthogonal to each other, and the third outer side surface 502c and the fourth outer side surface 502d are planes that are orthogonal to each other.

In FIG. 13 an axis passing through a midpoint between the third side surface 502c and the fourth side surface 502d and vertical to the third side surface 502c and the fourth side surface 502d is shown as the X-axis, and an axis passing through a midpoint between the first side surface 502a and the second side surface 502b and parallel to the first side surface 502a and the second side surface 502b is shown as the Y-axis.

As shown in FIGS. 13 and 14, in the actuating part 520 of the actuating member 502, cutout parts 526 that are throughholes are provided inside the fixed parts 523, respectively, so as to pass vertically therethrough. As a result, inside the first side surface 502a in the actuating part 520, a first X-direction deformable part 527a that extends along an X-axis is formed in a part that is sandwiched between the cutout part 526 and the cutout part 526, and that is sandwiched between the fixed part 523 and the fixed part 523. Further, inside the second side surface 502b, a second X-direction deformable part 527b that extends along an X-axis is formed in a part that is sandwiched between the cutout part 526 and the cutout part 526, and that is sandwiched between the fixed part 523 and the fixed part 523. Further, inside the third side surface 502c, a first Y-direction deformable part 527c that extends along a Y-axis is formed in a part that is sandwiched between the cutout part 526 and the cutout part 526, and that is sandwiched between the fixed part 523 and the fixed part 523. Also, inside the fourth side surface 502d, a second Y-direction deformable part 527d that extends along a Y-axis is formed in a part that is sandwiched between the cutout part 526 and the cutout part 526, and that is sandwiched between the fixed part 523 and the fixed part 523.

The deformable parts 527a, 527b, 527c, and 527d extend in four directions that are orthogonal to one another around the operating knob 522, and when the operating knob 522 is tilted in any one direction, strain is given to any one of the deformable parts 527a, 527b, 527c, and 527d.

The flexible substrate 503 is installed in and fixedly bonded to the upper surface of the actuating part 520 formed in a region inside the actuating member 502. The external shape of the flexible substrate 503 corresponds approximately to the contour of the actuating part 520. Further, a circular operation hole 531 is formed in a central part of the flexible substrate 503, and with the flexible substrate 503 being installed on the upper surface of the actuating part 520, the operating knob 522 passes through the operation hole 531, and projects upward.

Strain detecting elements Ra, Rb, Rc, and Rd are fixed and mounted on the upper surface of the flexible substrate 503. These strain detecting elements Ra, Rb, Rc, and Rd change in electric resistance according to the amount of strain in an expansion direction. The strain detecting element Ra is attached to the upper surface of the first X-direction deformable part 527a. Similarly, the strain detecting elements Rb, Rc, and Rd are attached to the upper surfaces of the second X-direction deformable part 527b, the first Y-direction deformable part 527c, and the second Y-direction deformable part 527d, respectively. In addition, if the strain detecting element Ra is attached to the upper surface of the first X-direction deformable part 527a in a position where it is slightly deviated towards the first side surface 502a, the deformation amount of the first X-direction deformable part 527a can be effectively detected. This is also the same in the strain detecting elements Rb, Rc, and Rd.

Similarly, a protruding part that extends in one direction along the X-axis is formed on the flexible substrate 503, and a pair of conductive lands 551 and 552 are exposed to the protruding part. A pair of lands 553 and 554 are also exposed to the protruding part extending in the other direction along the X-axis of the flexible substrate 503. Conductive patterns that electrically connect the lands 551, 552, 553, and 554 with the strain detecting elements Ra, Rb, Rc, and the Rd, respectively, are formed on the upper surface of the flexible substrate 503. A circuit that is configured on the flexible substrate 503 is similar to the first embodiment, and is as shown in FIG. 4.

Connecting terminals 561, 562, 563, and 564 are attached to the actuating member 502. These connecting terminals 561, 562, 563, and 564 are inserted into a molding die and integrated with the actuating member 502, when the actuating member 502 is formed of synthetic resin. The connecting terminal 561 and the connecting terminal 562 protrude outward from the first side surface 502a of the actuating member 502. In the actuating part 520, connecting pieces 561a and 562a integral with the connecting terminals 561 and 562 are exposed at almost the same surface as the surface of the actuating part 520, and clamping pieces 561b and 562b that are vertically bent from the connecting pieces 561a and 562a are provided. The connecting terminal 563 and the connecting terminal 564 protrude outward from the second side surface 502b of the actuating member 502. In the actuating part 520, connecting pieces 563a and 564a integral with the connecting terminals 563 and 564 appear at almost the same surface as the surface of the actuating part 520, and clamping pieces 563b and 564b that are vertically bent from the connecting pieces 563a and 564a are provided.

Further, FG terminals 566 and 566 are attached to the third side surface 502c and fourth side surface 502d of the actuating member 502. The FG terminals 566 and 566 are provided for releasing static electricity to a grounding part.

As shown in FIG. 13, fixing projections 528 are integrally formed on the upper surfaces 523a of the fixed parts 523 of the actuating member 502 so as to project therefrom.

The lid 504 is formed of a metal plate. The shape of the lid 504 corresponds approximately to the shape of the actuating member 502 in plan view. Fixing holes 541 are formed at four corners of the lid 504. The fixing holes 541 are formed in positions corresponding to the projections 528 provided in the actuating member 502. An operation hole 542 is formed in the center of the lid 504. The internal diameter of the operation hole 542 is made slightly greater than the diameter of the operating knob 522.

A method of assembling the above input device 501 adheres the flexible substrate 503 to the upper surface of the actuating part 520 formed in a one-step lower position of the actuating member 502, installs the strain detecting element Ra on the first X-direction deformable part 527a, and installs the strain detecting element Rb on the second X-direction deformable part 527b. Further, the strain detecting element Rc is installed on the first Y-direction deformable part 527c, and the strain detecting element Rd is installed on the second Y-direction deformable part 527d.

At this time, the land 551 formed in the flexible substrate 503 is made to face the connecting piece 561a of the connecting terminal 561, and the land 552 of the flexible substrate 503 is made to face the connecting piece 561a of the connecting terminal 562. Similarly, the lands 553 and 554 formed in the flexible substrate 503 are made to face the connecting pieces 563a and 564a of the connecting terminals 563 and 564, respectively. Furthermore, the clamping piece 561b of the connecting terminal 561 and the clamping piece 562b of the connecting terminal 562 are bent, thereby holding the flexible substrate 503, and electrically connecting the lands 551 and 552 with the connecting pieces 561a and 562a. Similarly, the clamping piece 563b of the connecting terminal 563 and the clamping piece 564b of the connecting terminal 564 are bent, thereby holding the flexible substrate 56, and electrically connecting the lands 553 and 554 with the connecting pieces 563a and 564a.

Thereafter, the lid 504 is fixed to the actuating member 502 by covering the lid 504 on the actuating member 502, and causing the actuating member 522 to pass through the operation hole 542, and by inserting the projections 528 provided on the upper surface 523a of the fixed parts 523 of the actuating member 502 into the fixing holes 541 of the lid 504, respectively, and heating, pressing, and crushing the tips of the projections 528.

The fixed parts 523 are provided at four corners of the actuating member 502, respectively, the fixed parts 523 are connected to the wall parts 525, respectively, and the upper surfaces 523a of the fixed parts 523 and the upper surfaces 525a of the wall parts 525 are formed over the whole edge of the actuating member 502. Also, the lid 504 is closely attached to the upper surfaces 523a and 525a. Therefore, a space between the actuating part 520 and the lid 504 can be closed, dust hardly enters the case, and even if water may enter the case, this water is hardly spread.

FIG. 15 shows a state where the input device 501 is mounted on a substrate 580, such as a keyboard device.

The lower surface of the actuating member 502 of the input device 501 is installed on the surface of the substrate 580. As shown in FIG. 14, the installation surfaces 523b with a relatively wide area that are the lower surfaces of the fixed parts 523 are respectively provided at four corners of the lower surface of the actuating member 502, and the lower surfaces 525b of the wall parts 525 connect the installation surfaces 523b together. Accordingly, when the input device 501 is installed on the surface of the substrate 580, the installation surfaces 523b and the lower surfaces 525b are installed in a stable posture with wide area on the substrate 580. In this case, the input device 1 can be stably fixed on the surface of the substrate 580 by forming positioning holes in the substrate 580, and fitting the positioning projections 524 formed in the installation surfaces 523b into the positioning holes, respectively.

The connecting terminals 561, 562, 563, and 564 are installed in the conductive patterns formed on the surface of the substrate 580, and are fixed by soldering, etc. Further, the FG terminals 566 and 566 are soldered to a grounding pattern on the surface of the substrate 580.

In this input device 501, a power supply voltage is applied to the connecting terminal 561 and the land 551, and the connecting terminal 563 and the land 553 are set to grounding potential. When the operating knob 522 is tilted towards the first side surface 502a of the actuating member 502, or towards the second side surface 502b, the first X-direction deformable part 527a and the second X-direction deformable part 527b deform, and the resistance values of the strain detecting elements Ra and Rb attached to these parts, respectively, change. As a result, the potential of a midpoint between the strain detecting element Ra and the strain detecting element Rb changes, and this potential change is output via the connecting terminal 562 from the land 552.

Further, when the operating knob 522 is tilted towards the third side surface 502c of the actuating member 502, or towards the fourth side surface 502d, the first Y-direction deformable part 527c and the second Y-direction deformable part 527d deform, and the resistance values of the strain detecting elements Rc and Rd attached to these parts, respectively, change. Consequently, the potential of a midpoint between the strain detecting element Rc and the strain detecting element Rd changes, and this potential change is output via the connecting terminal 564 from the land 554.

In this input device 501, the deformable parts 527a, 527b, 527c, and 527d provided in the actuating member 502 are thinner than the fixed parts 523 provided at four corners. Therefore, when the operating knob 522 is operated, the deformable parts 527a, 527b, 527c, and 527d deform easily. Further, in the actuating member 502, the fixed parts 523 and wall parts 525 that are parts with a large height are provided so as to surround the whole periphery of the deformable parts 527a, 527b, 527c, and 527d, and the fixed parts 523 and the wall parts 525 are installed in the substrate 580. Consequently, when the operating knob 522 is operated so as to be tilted, strain is easily concentrated on the deformable parts 527a, 527b, 527c, and 527d of the actuating part 520 with a small thickness that are surrounded by the fixed parts 523 and the wall parts 525. Consequently, when the operating knob 522 is operated, an excessive stress hardly acts on the fixed parts 523 and the wall parts 525. Consequently, there is little damage given to soldered parts between the connecting terminals 561, 562, 563, and 564 and the substrate 580.

Since this input device 501 is configured within a range of the size of the actuating member 502 having the deformable parts, the whole input device is small and thin. This input device 501 can be mounted by soldering the connecting terminals 561, 562, 563, and 564 and the FG terminals 566 and 566 to conductive patterns formed on a substrate of a keyboard device, etc.

Figure 16:
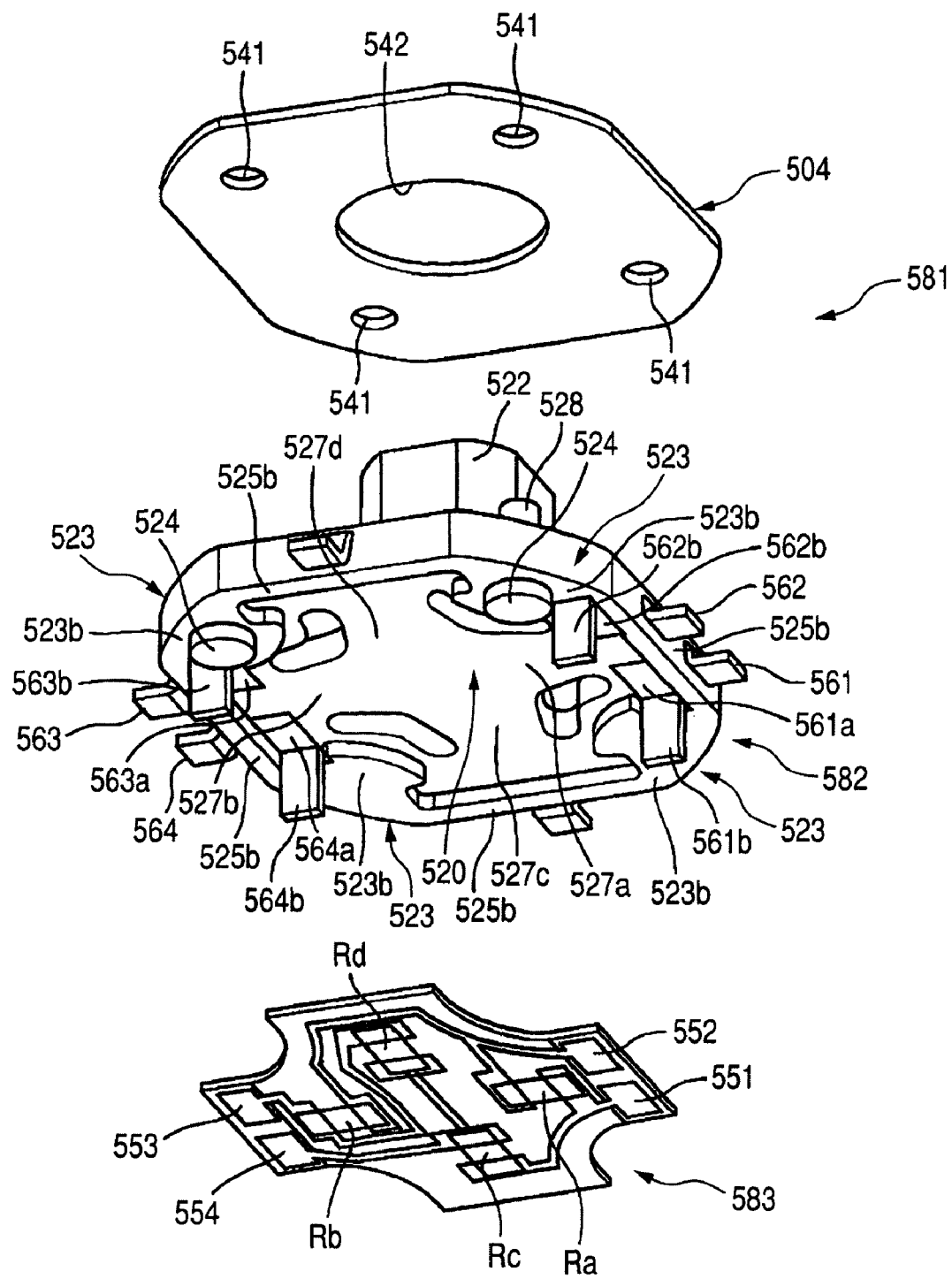
FIG. 16 is an exploded perspective view showing an input device according to a sixth embodiment.

Moreover, the surfaces of the deformable parts 527a, 527b, 527c, and 527d are covered with the lid 504, and as shown in FIG. 16, the deformable parts 527a, 527b, 527c, and 527d and the strain detecting elements Ra, Rb, Rc, and Rd installed in the deformable parts are separated from the lid 504. Consequently, even if the surface of the lid 504 is touched by a finger, any stress is not applied to the deformable parts 527a, 527b, 527c, and 527d, and detection output can be prevented from being generated carelessly irrespective of the operating knob 522 being not operated.

FIG. 16 is an exploded perspective view when an input device 581 according to a sixth embodiment of the invention is viewed from the installation surface side. In this input device 581, the same elements as those of the input device 501 of the fifth embodiment are denoted by the same reference numerals, and detailed description thereof is omitted herein.

In the actuating member 582 shown in FIG. 16, similarly to the actuating member 502 of the fifth embodiment, the fixed parts 523 are provided at four corners, and the wall parts 525 that connect the fixed parts 523 are provided. The installation surfaces 523b that are the lower surfaces of the fixed parts 523, and the lower surfaces 525b of the wall parts 525 are formed with a height difference from the lower surface of the actuating part 520 so as to protrude therefrom. Also, the deformable parts 527a, 527b, 527c, and 527d are formed in the actuating part 520 with a relatively small thickness. Further, the lid 504 is fixed to the upside of the actuating member 582, and the deformable parts 527a, 527b, 527c, and 527d are formed in positions that are separated slightly downward from the lower surface of the lid 504.

In the input device 581, a flexible substrate 583 is bonded to the lower surface of the actuating part 520. The strain detecting elements Ra, Rb, Rc, and Rd are mounted on the rear surface of the flexible substrate 583. The strain detecting element Ra is installed under the first X-direction deformable part 527a, and the strain detecting element Rb is installed under the second X-direction deformable part 527b. Further, the strain detecting element Rc is installed below the first Y-direction deformable part 527c, and the strain detecting element Rd is installed below the second Y-direction deformable part 527d.

Further, the lands 551, 552, 553, and 554 provided in the flexible substrate 583 are connected to the connecting terminals 561, 562, 563, and 564, respectively, and the flexible substrate 583 is clamped and held by the clamping pieces 561b, 562b, 563b, and 564b.

In this input device 581, the installation surfaces 523b and lower surfaces 525b that are the lower surfaces of the actuating member 582 are installed on the surface of a substrate of a keyboard device, etc. In this case, the strain detection elements Ra, Rb, Rc, and Rd are separated from the surface of a substrate, etc.

The effects that the input device 501 exhibits are the same as those of the input device 501 of the fifth embodiment.

Next, a seventh embodiment will be described.

Figure 17:
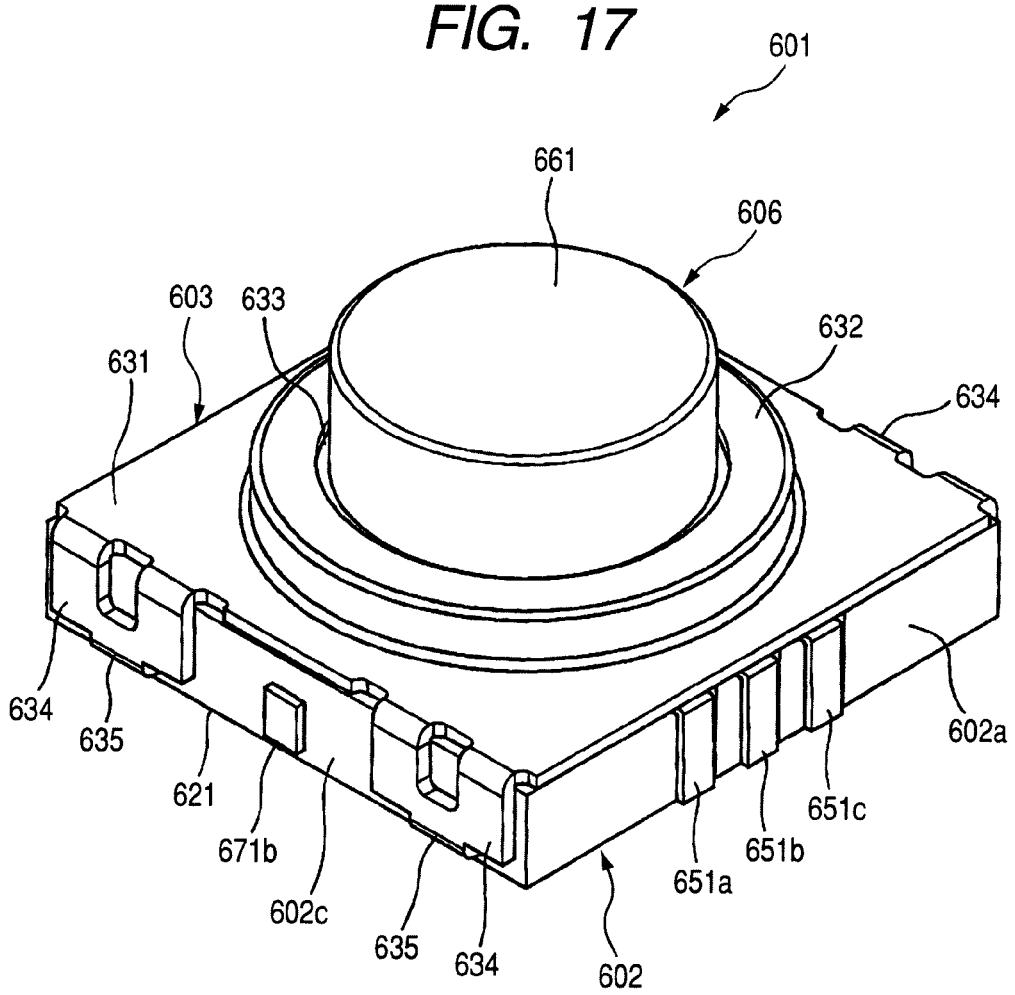
FIG. 17 is a perspective view showing an input device according to a seventh embodiment.
Figure 18:
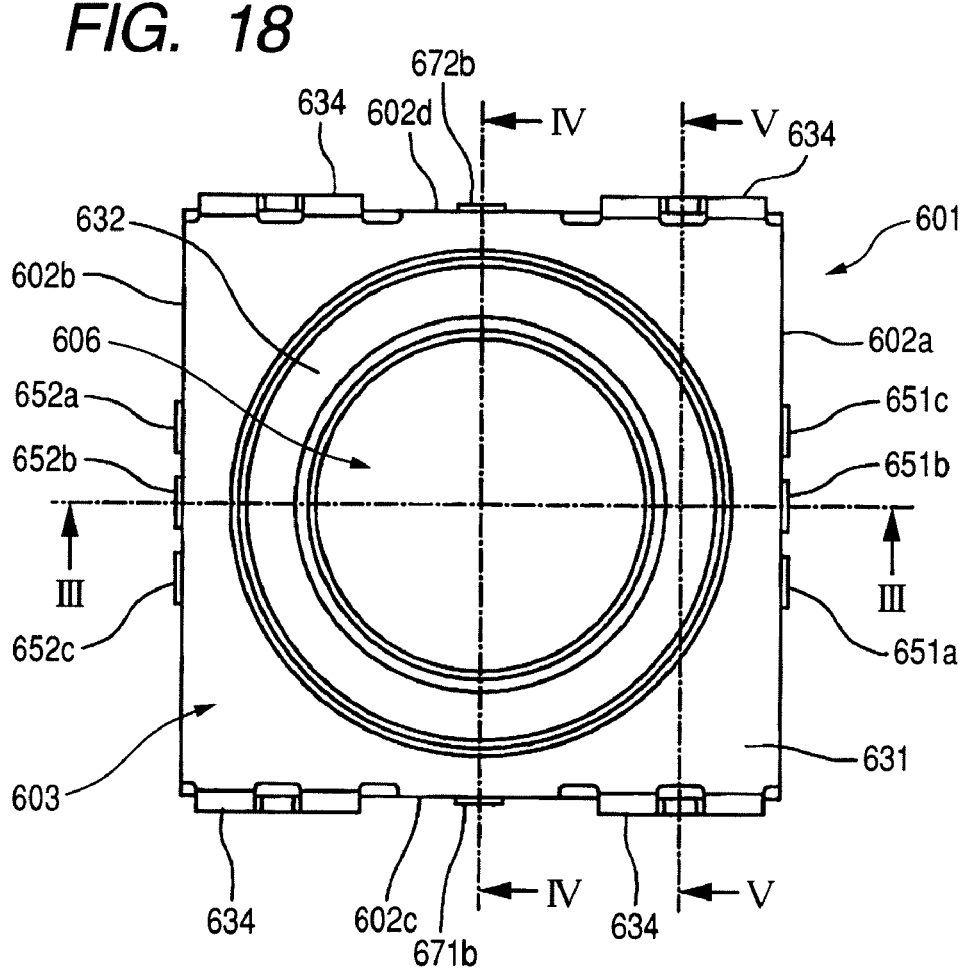
FIG. 18 is a plan view showing the input device according to the seventh embodiment.
Figure 19:
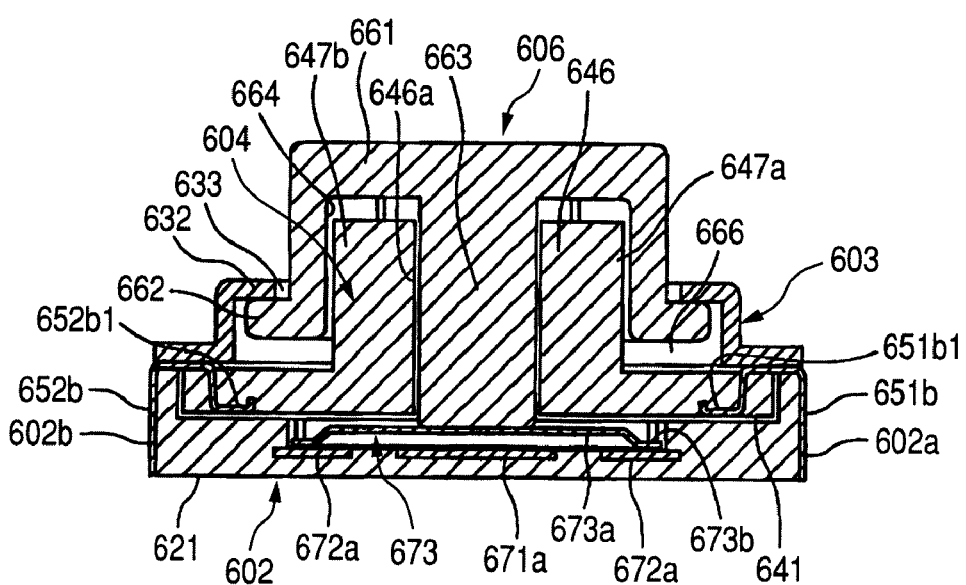
FIG. 19 is a sectional view when the input device shown in FIG. 18 is cut along the line III-III.
Figure 20:
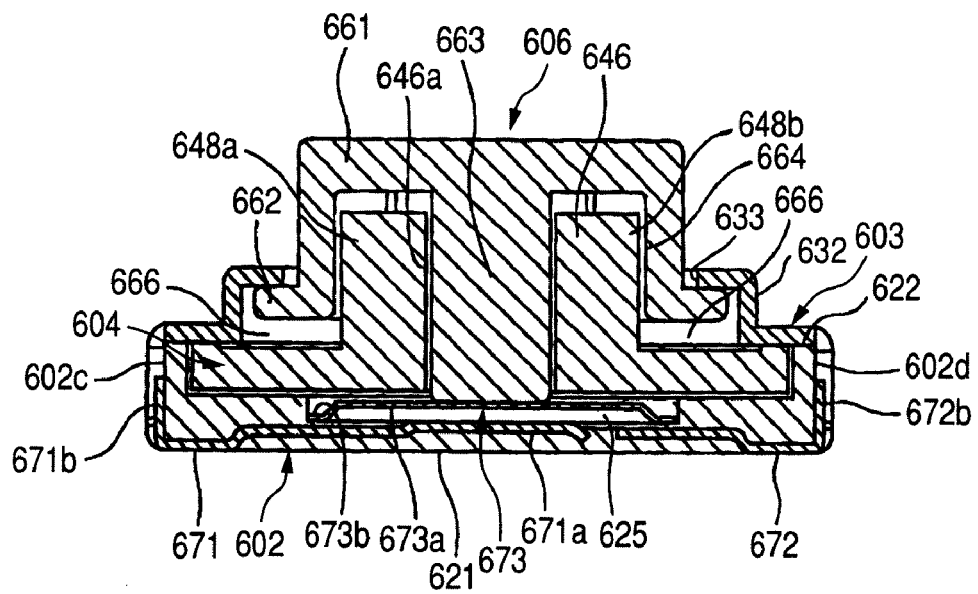
FIG. 20 is a sectional view when the input device shown in FIG. 18 is cut along the line IV-IV.
Figure 21:
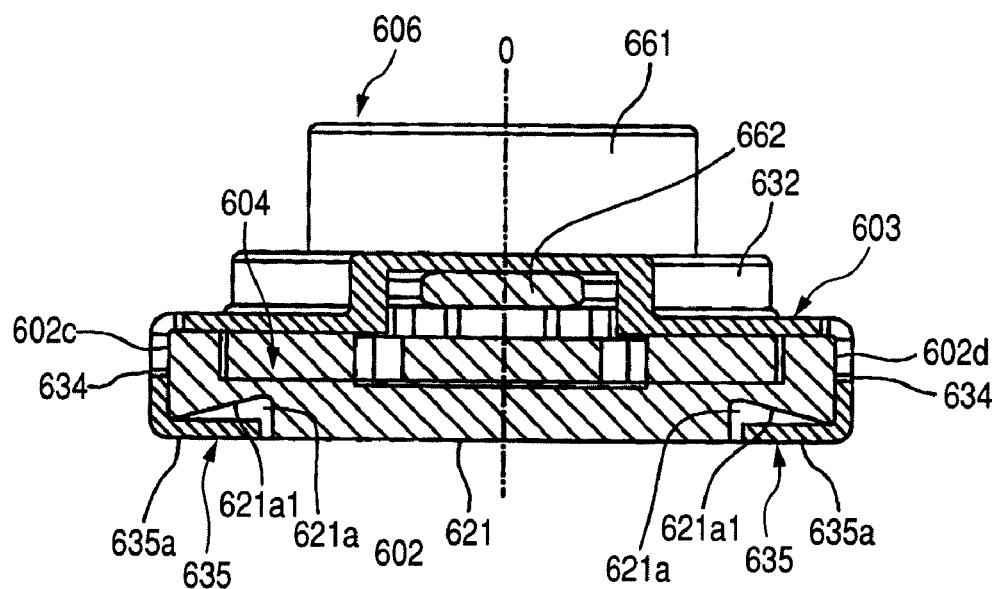
FIG. 21 is a sectional view when the input device shown in FIG. 18 is cut along the line V-V.
Figure 22:
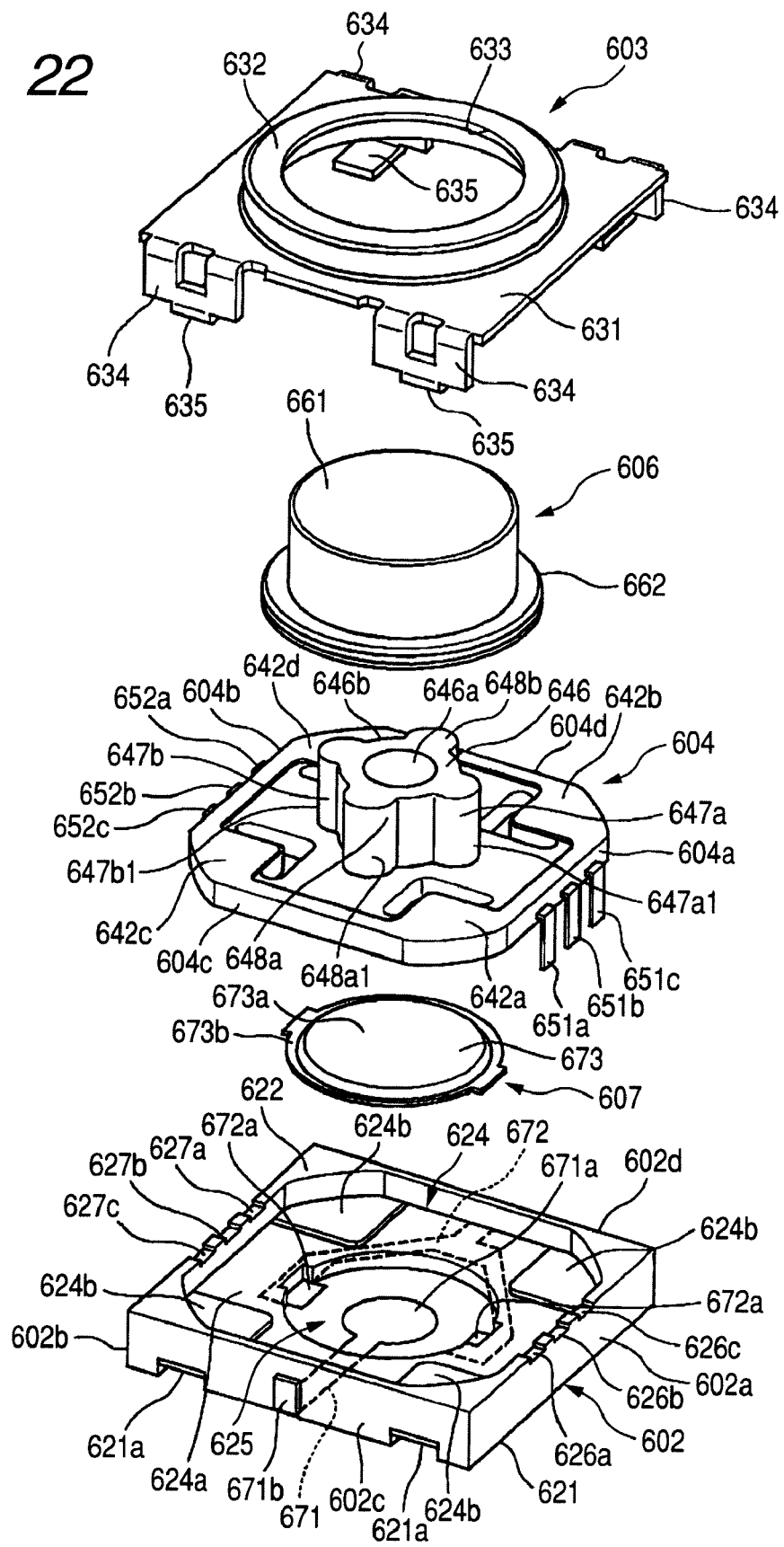
FIG. 22 is an exploded perspective view when the input device according to the seventh embodiment is viewed obliquely from above.
Figure 23:
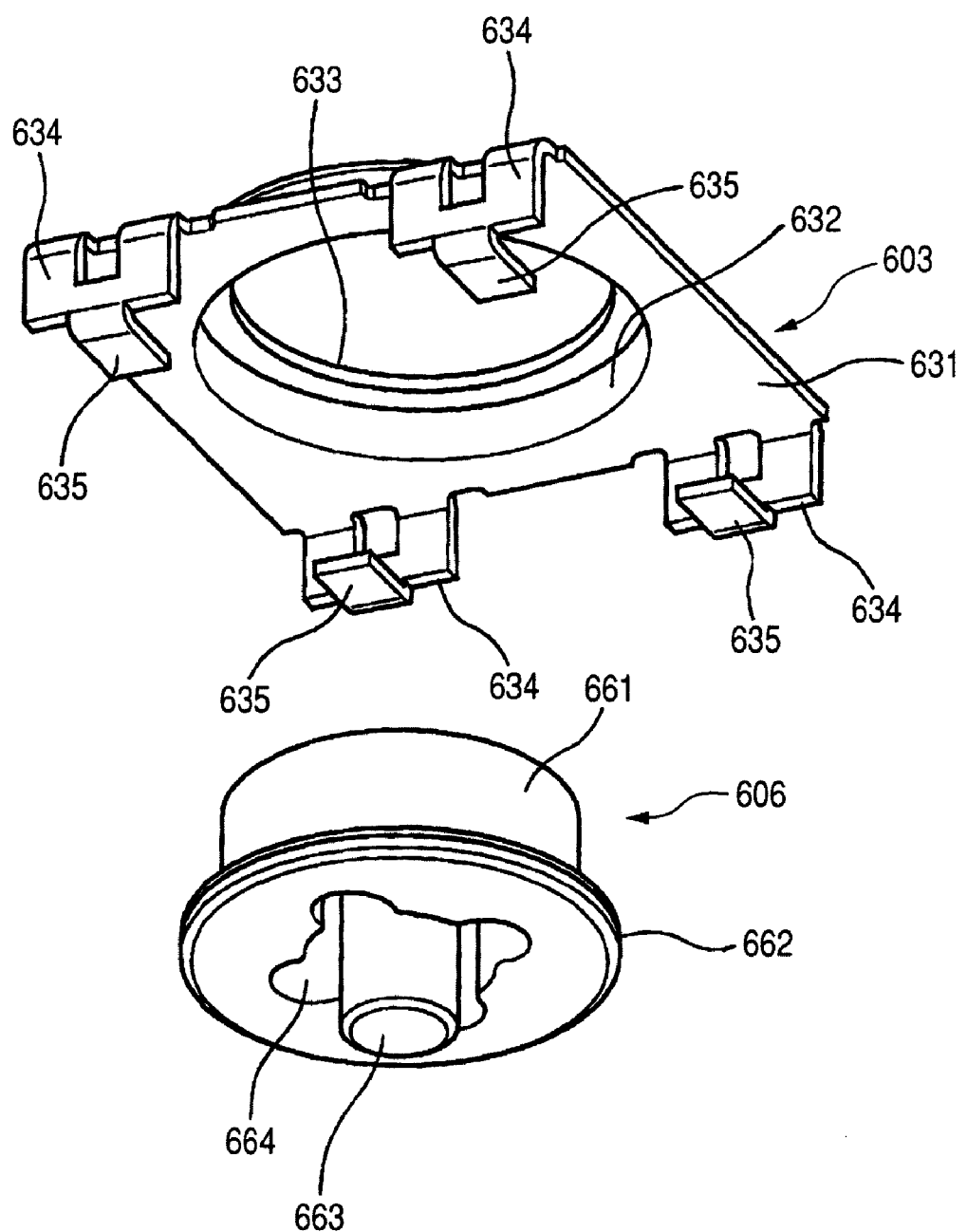
FIG. 23 is an exploded perspective view when an operating knob and an upper case that constitute the input device according to the seventh embodiment is viewed obliquely from below.
Figure 24A:
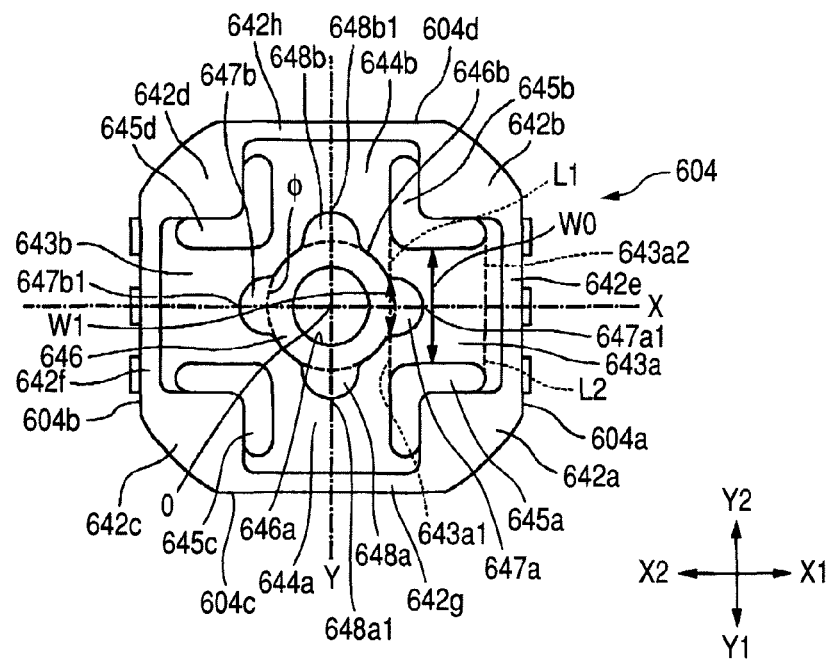
FIG. 24A is a plan view of the actuating member provided in the input device according to the seventh embodiment.
Figure 24B:
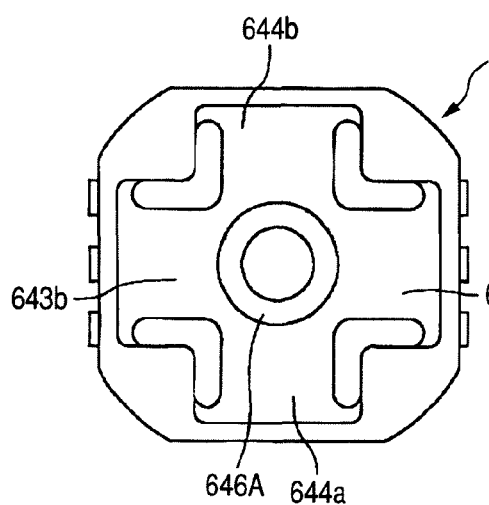
FIG. 24B is a plan view showing actuating members of a comparative example.
Figure 24C:
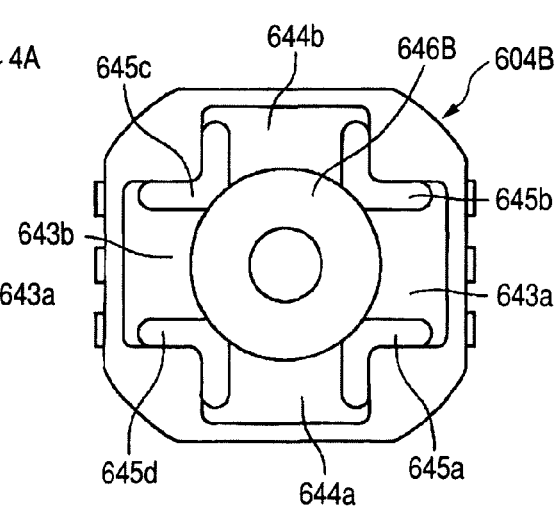
FIG. 24C is a plan view showing an actuating member according to another embodiment.
Figure 25A:
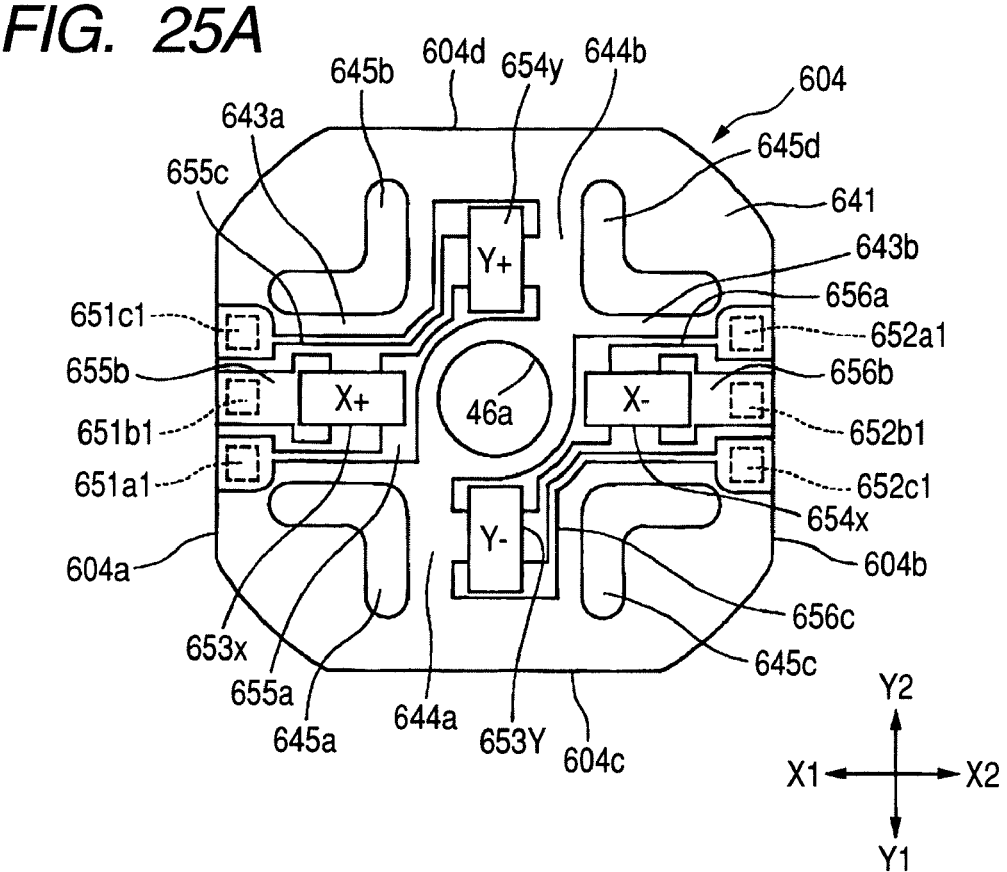
FIG. 25A is a bottom view showing the routing state of wiring lines of the actuating member provided in the input device of the seventh embodiment.
Figure 25B:
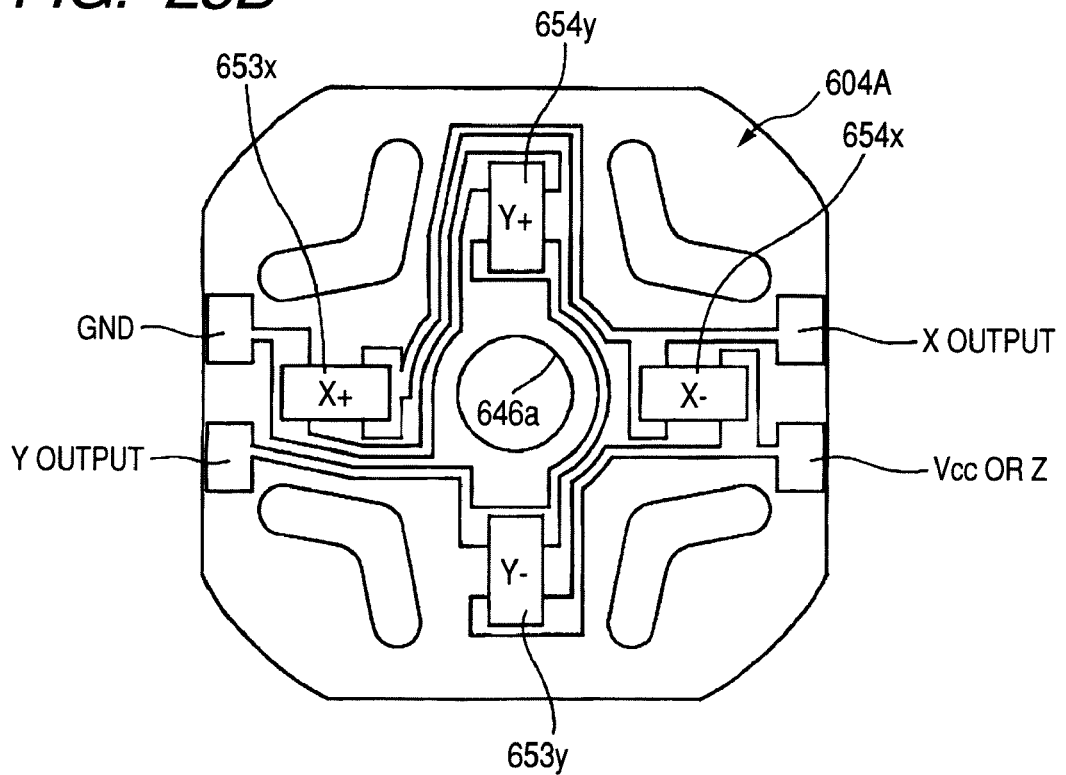
FIG. 25B is a bottom view showing another example of the routing state of wiring lines of the actuating member.

FIG. 17 is a perspective view showing an input device 601 according to the seventh embodiment, FIG. 18 is a plan view of the input device 601, FIG. 19 is a sectional view when the input device 601 shown in FIG. 18 is cut along the line III-III, FIG. 20 is a sectional view when the input device 601 shown in FIG. 18 is cut along the line IV-IV, and FIG. 21 is a sectional view when the input device 601 shown in FIG. 18 is cut along the line V-V. FIG. 22 is an exploded perspective view when the input device 601 is viewed obliquely from above, and FIG. 23 is an exploded perspective view when a part of the input device 601 is viewed obliquely from below. FIG. 24A is a plan view of the actuating member of an embodiment, and FIGS. 24B and 24C are plan views showing actuating members of a comparative example and another embodiment. FIGS. 25A and 25B are bottom views showing the structure of the bottom surfaces of actuating members according to embodiments. FIGS. 26A, 25B, 25C, and 25D are circuit diagrams showing circuits provided on the bottom surfaces of actuating members according to embodiments.

As shown in the exploded perspective view of FIG. 22, an input device 601 has a lower case 602 and an upper case 603, and the lower case 602 and the upper case 603 constitute a case. Also, an actuating member 604, an operating knob 606, and a push switch mechanism 607 are received between the lower case 602 and the upper case 603. This input device 601 can be a small device whose dimensions are 8 mm×8 mm or less in plan view, and can also be a small device whose dimensions 5 mm×5 mm or less.

The lower case 602 is formed of an electrically insulating synthetic resin material. Further, the lower case 602 is formed of a high hear-resistance synthetic resin material, such as LCP or PPS, so that it can resist the heat of a heating furnace in a solder reflow process. As shown in FIGS. 17 to 22, the lower surface 621 and upper surface 622 of the lower case 602 are planes, and the lower surface 621 and upper surface 622 of the lower case are parallel to each other. Further, a first side surface 602a and a second side surface 602b are planes parallel to each other, and a third side surface 602c and a fourth side surface 602d are planes parallel to each other. The first side surface 602a and the second side surface 602b are orthogonal to each other, and the third side surface 602c and the fourth side surface 602d are orthogonal to each other. Consequently, the lower case 602 is substantially square in plan view, and is of a thin type whose height is smaller than its width.

A bottomed receiving recess 624 that is open to the upper surface 622 is formed in the lower case 602, and the actuating member 604 is received in the receiving recess 624. Four supporting surfaces 624b are formed in one-step higher positions than a bottom surface 624a of the receiving recess 624. The supporting surfaces 624b are separated from one another, and are disposed at the four corners of the lower case 602, and the supporting surfaces 624b are located on the same plane. A recess 625 that receives the switch mechanism 607 is formed in the center of the bottom surface 624a of the receiving recess 624. The shape of the recess 625 in plan view is circular.

As shown in FIG. 22, the switch mechanism 607 has a central contact plate 671 and an outside contact plate 672. Both the central contact plate 671 and the outside contact plate 672 are formed of a conductive metal plate, and the central contact plate 671 and the outside contact plate 672 are buried in the lower case 602. As shown in the exploded perspective view of FIG. 22, and the sectional view of FIG. 20, a central contact point 671a is integrally formed in the central contact plate 671, and this central contact point 671a is exposed to the center of the bottom surface of the recess 625. A switch connecting terminal 671b is integrally formed at the other end of the central contact plate 671, and this switch connecting terminal 671b is bent outside the third side surface 602c of the lower case 2. The surface of the switch connecting terminal 671b is parallel to the third side surface 602c.

Two bifurcated outside contact points 672a and 672a are integrally formed in the outside contact plate 672, and these outside contact points 672a and 672a are exposed to both sides of the central contact point 671a on the bottom surface of the recess 625. A switch connecting terminal 672b is formed at the other end of the outside contact plate 672, and as shown in FIGS. 18 and 20, the switch connecting terminal 672b is bent outside the fourth side surface 602d of the lower case 602, and the surface of the fourth side surface 602d and the switch connecting terminal 672b are parallel to each other.

As shown in FIG. 22, an inverting member 673 is received in the recess 625 of the lower case 602. This inverting member 673 is formed of a conductive metal plate, and has an inverted part 673a formed in the shape of a dome, and a fixed connection part 673b at the periphery thereof. When the inverting member 673 is received in the recess 625, the fixed connection part 673b contacts the outside contact points 672a and 672a, and the central inverted part 673a faces the central contact point 671a at a distance upward therefrom. When a pressing force from above is applied to the inverted part 673a, the inverted part 673a is inverted to contact the central contact point 671a, and the central contact plate 671 and the outside contact plate 672 are electrically connected to each other.

The actuating member 604 is integrally formed of a synthetic resin material. The actuating member 604 is also formed of a high-resistant synthetic resin material, such as LCP or PPS.

As shown in the exploded perspective view of FIG. 22, the plan view of FIG. 24, and the bottom view of FIG. 25, the actuating member 604 is a plate-like member the shape of which in plan view is substantially square, and has side surfaces 604a and 604b that face each other, and side surfaces 604c and 604d that face each other. The actuating member 604 is formed in such a size that it is received in the receiving recess 624 formed in the lower case 602, with almost no clearance.

In FIG. 24, an axis passing through midpoints of both the side surface 604a and side surface 604b of the actuating member 604, and parallel to the side surface 604c and the side surface 604d is shown as the X-axis, an axis passing through midpoints of both the side surface 604c and side surface 604d of the actuating member 604, and parallel to the side surface 604a and the side surface 604b is shown as the Y-axis, and an intersection point of the X-axis and the Y-axis orthogonal to each other is represented by O.

As shown in FIG. 25A, a bottom surface 641 of the actuating member 604 is a plane. As shown in FIGS. 22 and 24, fixed parts 642a, 642b, 642c, and 642d are provided at four corners of the upper surface of the actuating member 604. The surfaces of the fixed parts 642a, 642b, 642c, and 642d are located on the same surface, and these surfaces are surfaces parallel to the bottom surface 641. On the upper surface of the actuating member 604, an elongate connecting part 642e that connects the fixed part 642a and the fixed parts 642b together is provided inside the side surface 604a. Similarly, an elongate connecting part 642f is provided inside the side surface 604b, and connecting parts 642g and 642h are provided inside the side surface 604c and the side surface 604d, respectively. The surfaces of the connecting parts 642e, 642f, 642g, and 642h are the same surfaces as the surfaces of the fixed parts 642a, 642b, 642c, and 642d, respectively. Consequently, the outer peripheral parts of the actuating member 604 where the fixed parts 642a, 642b, 642c, and 642d and the connecting parts 642e, 642f, 642g, and 642h are formed are thick-walled parts, and the part surrounded by these thick-walled parts is a thin-walled part that is smaller in thickness than the thick-walled parts.

When the actuating member 604 is received in the receiving recess 624 of the lower case 602, four corners of the bottom surface 641 of the actuating member 604 abut on four supporting surfaces 624b provided at the bottom part of the receiving recess 624, and the fixed parts 642a, 642b, 642c, and 642d provided at four corners of the upper surface of the actuating member 604 abut on the lower surface of the upper case 603. In this way, the four corner parts that are the thick-walled parts of the actuating member 604 are firmly sandwiched and fixed by the bottom part of the receiving recess 624 of the lower case 602, and the lower surface of the upper case 603.

Four through-holes 645a, 645b, 645c, and 645d are formed in the thin-walled part of the actuating member 604 so as to pass vertically therethrough. As shown in FIG. 24, the through-hole 645a is formed in the shape of the letter "L" along the inside of the fixed part 642a. Similarly, the through-holes 645b, 645c, and 645d are formed in the shape of the letter "L" along the insides of the fixed parts 642b, 642c, and 642d, respectively.

Also, in the thin-walled part of the actuating member 604, a first X-direction deformable part 643a is formed in a part sandwiched between the through-hole 645a and the through-hole 645b, and a second X-direction deformable part 643b is formed in a part sandwiched between the through-hole 645c and the through-hole 645d. Further, a first Y-direction deformable part 644a is formed in a part sandwiched between the through-hole 645a and the through-hole 645c, and a second Y-direction deformable part 644b is formed in a part sandwiched between the through-hole 645b and the through-hole 645d.

The first X-direction deformable part 643a means a region sandwiched between the through-hole 645a and the through-hole 645b. That is, as shown in FIG. 24, when a line L1 that connects the edges of the through-hole 645a and the through-hole 645b on the side of X2 s is set, a base end 643a1 that is an end of the first X-direction deformable part 643a on the side of the center O is located on the line L1. Further, when a line L2 that connects the edges of the through-hole 645a and the through-hole 645b on the side of the X1 is set, a tip 643a2 of the first X-direction deformable part 643a is located on the line L2.

As shown in FIG. 24, the width W0 of the first X-direction deformable part 643a is uniform from the base end 643a1 to the tip 643a2. However, the width may differ according to the location of the first X-direction deformable part 643a. Further, a line that bisects the width W0 of the first X-direction deformable part 643a coincides with the X-axis.

The second X-direction deformable part 643b is located in a position symmetrical with the first X-direction deformable part 643a across the center O, and is formed in a symmetrical shape. The first Y-direction deformable part 644a and the second Y-direction deformable part 644b also have a shape symmetrical with each other, and they have the same dimension and shape as those of the first X-direction deformable part 643a, and the second X-direction deformable part 643b. That is, centerlines that bisects the width of the first X-direction deformable part 643a and the second X-direction deformable part 643b and the width of the first Y-direction deformable part 644a and the second Y-direction deformable part 644b respectively coincide with the X-axis and the Y-axis that are orthogonal each other, and the deformable parts 643a, 643b, 644a, and 644b have a base end located near the center O, and a tip located apart from the center O.

As shown in FIG. 22, the operating protrusion 646 is integrally formed in the center of the thin-walled part of the actuating member 604. The axial centerline of the operating protrusion 646 coincides with the center O that is an intersection point of the X-axis and the Y-axis. Further, the axial centerline of the operating protrusion 646 is orthogonal to the X-axis and the Y-axis. An axis hole 646a is formed in the center of the operating protrusion 646 so as to pass vertically through the actuating member 604. This axis hole 646a has a circular cross-section.

An outer peripheral surface 646b of a body of the operating protrusion 646 is a cylindrical surface as indicated by a broken line Φ in FIG. 24. Also, a first X-direction protruding part 647a and a second X-direction protruding part 647b that protrude from the outer peripheral surface 646b in directions opposite to each other along the X-axis are integrally formed in the operating protrusion 646. Further, a second Y-direction protruding part 648a and a second Y-direction protruding part 648b that protrude from the outer peripheral surface 646b in directions opposite to each other along the Y-axis are integrally formed.

The first X-direction protruding part 647a has a tip part 647a1 that is directed to the tip 643a2 of the first X-direction deformable part 643a. This tip part 647a1 is located on the side of the tip 643a2 beyond the base end 643a1 of the first X-direction deformable part 643a. That is, a part of the first X-direction protruding part 647a is located on the first X-direction deformable part 643a. The tip part 647a1 has a curved surface shape, and as shown in FIG. 24, a boundary part between the tip part 647a1 and the first X-direction deformable part 643a is a curved line, and is a substantially circular-arc curved line. The maximum distance from the line L1 where the base end 643a1 of the first X-direction deformable part 643a is located to the tip part 647a1 of the first X-direction protruding part 647a is preferably ⅓ or more, and more preferably ¼ or more of the length (distance on the X-axis from the line L1 to the line L2) of the first X-direction deformable part 643a.

In FIG. 24, the width of the first X-direction protruding part 647a on the line L1 is represented by W1. On the line L1, the width W1 of the first X-direction protruding part 647a is shorter than the width W0 of the first X-direction deformable part 643a, and parts of the first X-direction deformable part 643a are located on both sides (Y1-side and Y2-side) of the first X-direction protruding part 647a nearer to the X1-side to than the line L1. The width W1 is preferably ⅔ or less, and more preferably ½ of the width W0.

The tip part 647a1 of the first X-direction protruding part 647a is located on the first X-direction deformable part 643a. Therefore, when a pressing force is applied to the operating protrusion 646 in a direction in which the protrusion is tilted to the X1-side, this pressing force directly acts on the first X-direction deformable part 643a, which is located under the tip part 647a1, directly from the tip part. Thus, bending strain is easily caused in the first X-direction deformable part 643a. Further, the tip part 647a1 of the first X-direction protruding part 647a has a curved surface shape. Therefore, when a pressing force is applied to the operating protrusion 646, a stress can be distributed in the boundary part between the tip part 647a1 and the first X-direction deformable part 643a, and an excessive stress can be prevented from being concentrated on any one place of the first X-direction deformable part 643a, and a failure, such as cracking, is easily prevented.

Moreover, the width W0 of the first X-direction deformable part 643a is greater than the width W1 of the first X-direction protruding part 647a, and parts of the first X-direction deformable part 643a exist on both sides of the first X-direction protruding part 647a on the side of Y1 and Y2. Consequently, when a pressing force in the direction of X1 is applied to the operating protrusion 646, an excessive pressing force does not act directly over the whole width W0 of the first X-direction deformable part 643a from the tip part 647a1. That is, both sides of the tip part 647a1 of the first X-direction deformable part 643a are reinforced by parts of first X-direction deformable part 643a. As a result, when a pressing force is applied to the operating protrusion 646, the first X-direction deformable part is hardly damaged.

FIG. 24B shows an actuating member 604A of a comparative example. In this actuating member 604A, an operating protrusion 646A has a small-diameter cylindrical shape, and this operating protrusion 646A is separated from the first X-direction deformable part 643a, the second X-direction deformable part 643b, the first Y-direction deformable part 644a, and the second Y-direction deformable part 644b. Accordingly, for example, when a pressing force is applied to the actuating member 646A in the X1 direction in which the actuating member is tilted, any strain to be given to the first X-direction deformable part 643a is small. Consequently, the sensitivity becomes low.

On the other hand, in an actuating member 604B shown in FIG. 24C, an operating protrusion 646B has a cylindrical shape, and has a large diameter. Accordingly, a part of an outer peripheral surface of the operating protrusion 646B is located on the first X-direction deformable part 643a, the second X-direction deformable part 643b, the first Y-direction deformable part 644a, and the second Y-direction deformable part 644b. Accordingly, compared with the comparative example shown in FIG. 24B, it is easy to give strain to each modified example from the operating protrusion 646B. Accordingly, the embodiment of FIG. 24C is one of the embodiments of the invention. However, in the structure shown in FIG. 24 (C), when a force in the direction of X1 is applied to the operating protrusion 646B, the force gives a large stress to the first X-direction deformable part 643a over its whole width. Moreover, it is easy to concentrate the stress on a boundary part between the outer peripheral surface of the operating protrusion 646B, the X-direction deformable part 643a, and the through-holes 645a and 645b. Therefore, any damage may be caused in the boundary part.

On the other hand, in the input device 601 of the embodiment shown in FIG. 24A, when the operating protrusion 646 is pushed in the X1 direction, bending strain is easily generated in the first X-direction deformable part 643a, the first X-direction deformable part 643a is not easily fatigued, and there is little risk of being damaged.

Although the second X-direction protruding part 647b also has a tip part 647b1 having a curved surface shape that is directed to the X2 side, the positional relationship between the tip part 647b1 and the second X-direction deformable part 643b is the same as the relationship between the tip part 647a1 and the first X-direction deformable part 643a. Further, the first Y-direction protruding part 648a also has a tip part 648a1, and the second Y-direction protruding part 648b also has a tip part 648b1. The positional relationship between the tip part 648a1 and the first Y-direction deformable part 644a and the positional relationship between the tip part 648b1 and the second Y-direction deformable part 644b are also the same as the relationship between the tip part 647a1 and the first X-direction deformable part 643a.

As shown in FIG. 22, detecting terminals 651a, 651b, and 651c are buried in the side surface 604a of the actuating member 604 by an insert molding process, and detecting terminals 652a, 652b, and 652c are buried in the side surface 604b. The detecting terminals 651a, 651b, and 651c are exposed to the side surface 604a of the actuating member 604, and are bent downward. Small recesses 626a, 626b, and 626b are formed in the upper surface of the lower case 602. When the actuating member 604 is received in the receiving recess 624 of the lower case 602, the bases of the detecting terminals 651a, 651b, and 651c are fitted into the small recesses 626a, 626b, and 626c, respectively. Further, as shown in FIG. 17, the detecting terminals 651a, 651b, and 651c are tightly disposed on the outside surface of the first side surface 602a of the lower case 602.

Similarly, the detecting terminals 652a, 652b, and 652c are exposed to the side surface 604b of the actuating member 604, and are bent downward. Small recesses 627a, 627b, and 627c are formed in the upper surface of the lower case 602. When the actuating member 604 is received in the receiving recess 624 of the lower case 602, the bases of the detecting terminals 652a, 652b, and 652c are fitted into the small recesses 627a, 627b, and 627c, respectively. Further, the detecting terminals 652a, 652b, and 652c are tightly disposed on the outside surface of the first side surface 602b of the lower case 602.

As shown in the sectional view of FIG. 19, the tip of the detecting terminal 651b is bent towards the bottom part inside the actuating member 604, and a part the detecting terminal becomes a conductive piece 651b1. The surface of this conductive piece 651b1 appears at the same surface as the bottom surface 641 of the actuating member 604. As shown in FIG. 25, a conductive piece 651a1 integral with the detecting terminal 651a, and a conductive piece 651c1 integral with the detecting terminal 651c also appear at the same surface as the bottom surface 641. Moreover, a conductive piece 652a1 integral with the detecting terminal 652a, a conductive piece 652b1 integral with the detecting terminal 652b, and a conductive piece 652c1 integral with the detecting terminal 652c also appear at the same surface as the bottom surface 641.

As shown in FIG. 25A, the bottom surface 641 of the actuating member 604 is a plane. On this bottom surface 641, a detecting element 653x is provided in the first X-direction deformable part 643a, and a detecting element 654x is provided in the second X-direction deformable part 643b. Further, a detecting element 653y is provided in the first Y-direction deformable part 644a, and a detecting element 654y is provided in the second Y-direction deformable part 644b. The detecting elements 653x, 653y, 654x, and 654y are strain gages, respectively, and their electric resistances change according to the amount of strain in an expansion direction and a contraction direction. In the circuit diagrams of FIGS. 25 and 26, in order to identify individual detecting elements, the detecting element 653x is represented by "X+," and the detecting element 653y is represented by "Y−". Further, the detecting element 654x is represented by "X−1," and the detecting element 654y is represented by "Y+."

As shown in FIG. 25A, conductive patterns are directly formed on the bottom surface 641 of the actuating member 604 by a printing process. That is, the conductive patterns are formed on the bottom surface 641 of the actuating member 604 with conductive ink, such as silver paste. In this printing process, the conductive patterns are electrically connected to the conductive pieces 651a1, 651b1, and 651c1, and the conductive pieces 652a1, 652b1, and 652c1 that appear on the bottom surface 641. The detecting elements 653x, 653y, 654x, and 654y are formed on the bottom surface 641 along with the conductive patterns by a printing process, and an electrode part of each of the detecting elements 653x, 653y, 654x, and 654y and each of the conductive patterns are electrically connected to each other. However, the detecting elements 653x, 653y, 654x, and 654y may be formed separately from the actuating member 604, and the detecting elements may be stuck on the bottom surface 641 of the actuating member 604.

As shown in FIG. 22, in the actuating member 604, the three detecting terminals 651a, 651b, and 651c are provided in the side surface 604a, the three conductive pieces 651a1, 651b1, and 651c1 are provided in the bottom surface 641, the three detecting terminals 652a, 652b, and 652c are provided in the side surface 604b, and the three conductive pieces 652a1, 652b1, and 652c1 appear on the bottom surface 641. As such, three detecting terminals are provided in the side surface 604a and the side surface 604b, respectively, and a total of six conductive pieces 651a1, 651b1, and 651c1 and conductive pieces 652a1, 652b1, and 652c1 are provided in the bottom surface 641. Therefore, routing of the conductive patterns to be formed on the bottom surface 641 of the actuating member 604 can be simply made.

Figure 26A:
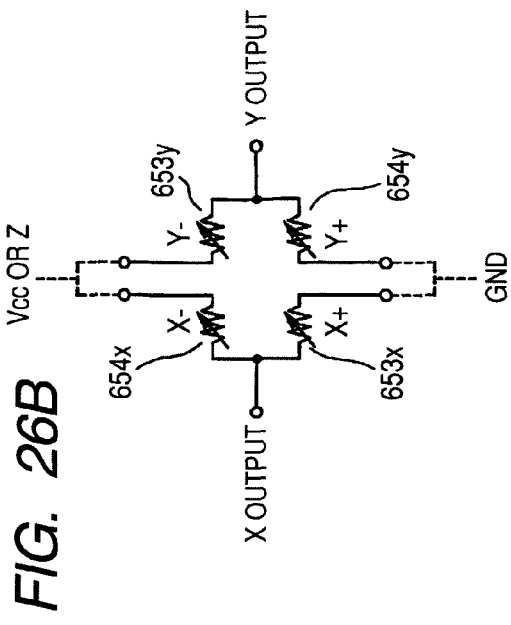
FIG. 26A is a circuit diagram of an input device according to an embodiment.

Referring to the circuit diagrams of FIGS. 25A and 26A, a conductive pattern 655a is formed between the conductive piece 651a1, the detecting element 653x, and the detecting element 654y. A conductive pattern 655b is formed between the conductive piece 651b1 and the detecting element 653x, and the conductive pattern 655c is formed between the conductive piece 651c1 and the detecting element 654y. A conductive patterns 656a is formed between the conductive piece 651a1, the detecting element 654x, and the detecting element 653y. A conductive pattern 656b is formed between the conductive piece 651b1, and the detecting element 654x, and a conductive pattern 656c is formed between the conductive piece 651c1 and the detecting element 653y.

As shown in FIG. 25A, in the first X-direction deformable part 643a and the second X-direction deformable part 643b, only one conductive pattern passes through both the detecting element 653x and the detecting element 654x, respectively. Thus, the number of passage of conductive patterns is small. Further, in the first Y-direction deformable part 644a and the second X-direction deformable part 644b, only one conductive pattern passes through both the detecting element 653y and the detecting element 654y, respectively. Thus, the number of passage of conductive patterns is small.

As indicated by a broken line in FIG. 26A, when the input device 601 of the above embodiment is mounted on a substrate, the detecting terminal 651b and the detecting terminal 652b are connected together by conductive patterns (that is, conductors provided outside the input device 601) formed on the surface of the substrate, thereby obtaining an X output. Further, the detecting terminal 651c and the detecting terminal 652c are connected together by conductive patterns (that is, conductors provided outside the input device 601) formed on the surface of the substrate, thereby obtaining a Y output.

FIG. 25B shows an actuating member 604A that exhibits a function equivalent to the actuating member 604 in the above embodiment. In this actuating member 604A, similarly to the actuating member 604 of the above embodiment, the detecting element 653x is provided in a first X-direction deformable part, and the detecting element 654x is provided in a second X-direction deformable part. Further, the detecting element 653y is provided in the first Y-direction deformable part, and the detecting element 654y is provided in the second Y-direction deformable part.

Also, a total of four detecting terminals are provided in the actuating member 604A. As shown in the circuit diagram of FIG. 26D, the four detecting terminals are a power supply terminal represented by "Vcc" or "Z," a grounding terminal represented by "GND," an X output terminal, and a Y output terminal. As shown in FIG. 25B, in the example in which the four detecting terminals are provided, the structure of routing of circuit patterns provided on the bottom surface of the actuating member 604A becomes complicated compared with the embodiment shown in FIG. 25A. In FIG. 25B, for example, it is necessary to form two patterns on the left of the detecting element 654y, and to form one pattern on the right of the detecting element 654y. Further, it is necessary to form two patterns in one side part of the detecting element 653x. Moreover, in the example shown in FIG. 25B, it is necessary to form a circuit pattern even between each of the detecting elements 653x, 654x, 653y, and 654y, and the axis hole 646a.

On the other hand, in the embodiment shown in FIG. 25A, a total of six detecting terminals are provided in the actuating member 604, and as shown in FIG. 26A, by the conductors provided outside the input device 601, the detecting terminal 651b and the detecting terminal 652b are electrically connected to each other, and the detecting terminal 651c and the detecting terminal 652c are electrically connected to each other, so that routing of the circuit patterns to be formed on the actuating member 604 can be simplified. Consequently, the actuating member 604 in the embodiment shown in FIG. 25A is easily made small compared with the example shown in FIG. 25B.

The operating knob 606 shown in FIGS. 22 and 23 is made of synthetic resin, and an operation body 661 is cylindrical. A flange part 662 is formed so as to protrude from a peripheral edge of a lower end of the operating knob 606. As shown in FIG. 23, a pressing projection 663 is provided in the operating knob 606 so as to project integrally from the bottom surface thereof, and a fitting recess 664 is formed at the periphery of the pressing projection 663. The pressing projection 663 is cylindrical, and as shown in FIGS. 19 and 20, the pressing projection 663 is inserted into the axis hole 646a formed in the center O of the actuating member 604, with almost no clearance. Also, the lower end of the pressing projection 663 faces the inverted part 673a of the inverting member 673 that constitutes the switch mechanism 607, from above.

Further, the cross-sectional shape when the fitting recess 664 is cut in a plane parallel to an X-Y plane is almost the same as the cross-sectional shape of the operating protrusion 646 of the actuating member 604, and the cross-sectional shape of each of the protruding parts 647a, 647b, 648a, and 648b. Consequently, when the pressing projection 663 is inserted into the axis hole 646a, the fitting recess 664 is fitted to the operating protrusion 646 and the protruding parts 647a, 647b, 648a, and 648b with almost no clearance, and the operating knob 606 and the operating protrusion 646 are connected together so that they may not rotate.

As shown in FIGS. 22 and 23, the upper case 603 is formed of a metal plate, and has a flat pressing part 631. When the upper case 603 is attached to the lower case 602, the lower surface of the pressing part 631 adheres tightly to the fixed parts 642a, 642b, 642c, and 642d of the actuating member 604, and these fixed parts 642a, 642b, 642c, and 642d are sandwiched between the lower case 602 and the upper case 603 so that they may not be moved.

A raised part 632 that is raised upward in the shape of a ring is formed in the central part of the upper case 603, and a circular opening 633 is formed in the raised part 632. As shown in FIGS. 19 and 20, when the upper case 603 is attached to the lower case 602, the operation body 661 of the operating knob 606 passes through the opening 633, and projects above the upper case 603. Further, as shown in FIGS. 19 and 20, the flange part 662 formed in the operating knob 606 is located inside the raised part 632, and a moving space 666 where the flange part 662 can be moved up and down is formed inside the raised part 632. The operating knob 606 is able to slide in a direction in which the inverting member 673 is pressed, in a range of the height of the moving space 666.

The upper case 603 are provided with four holding pieces 634 perpendicularly bent from two sides that face each other, and fixing claws 635 are integrally formed at tips of the holding pieces 634, respectively. After the inverting member 673, the actuating member 604, and the operating knob 606 are installed on the lower case 602, they are covered with the upper case 603. In this case, as shown in FIGS. 17 and 18, the holding pieces 634 are installed on the surfaces of the third side surface 602c and fourth side surface 602d of the lower case 602. Furthermore, the fixing claws 635 are bent towards the bottom surface 621 of the lower case 2.

As shown in FIGS. 21 and 22, a pair of fixing recesses 621a extending from the third side surface 602c, and a pair of fixing recesses 621a extending from the fourth side surface 602d are formed in the bottom surface 621 of the lower case 602. As shown in FIG. 21, a bottom surface 621a1 of each of the fixing recesses 621a is inclined so as to be gradually separated from the bottom surface 621, as it approaches the center O.

The fixing claws 635 that protrude from the holding pieces 634 of the upper case 602 are bent such that they are pressed against the fixing recesses 621a. Since the bottom surfaces 621a1 of the fixing recesses 621a are inclined planes, the fixing claws 635 can be bent an angle of less than 90 degrees with respect to the holding pieces 634. Further, the surfaces 635a of the fixing claws 635 can be prevented from greatly protruding from the bottom surface 621 of the upper case 602 due to springback after the bending. Consequently, in the input device 601 after assembling, the surfaces 635a of the fixing claws 635 and the bottom surface 621 of the lower case 602 becomes almost the same surface.

In the input device 601 of the present embodiment, as shown in FIG. 17, a part excluding the he operating knob 606 has a cubic chip shape, and it can be fixedly mounted on a substrate, etc. by a solder reflow process. In this case, the input device 601 can be firmly fixed on a substrate by soldering the four fixing claws 635 that appear at almost the same surface on the bottom surface of the lower case 602 to parts of a metallic film of a substrate, etc.

In the solder reflow process, the three detecting terminals 651a, 651b, and 651c that appear in the first side surface 602a of the lower case 602, and the three detecting terminals 652a, 652b, and 652c that appear in the second side surface 602b are soldered to conductive patterns formed on a substrate surface. In this case, as shown in FIG. 26A, the detecting terminal 652a is connected to a power supply pattern, and the detecting terminal 651a is connected to a grounding pattern. In this case, as shown in FIG. 26A, the detecting terminal 651b and the detecting terminal 652b are connected to an X output pattern, and the detecting terminal 651c and the detecting terminal 652c are connected to a Y output pattern. Moreover, the switch connecting terminal 671b that appears in the third side surface 602c, and the switch connecting terminal 672b that appears in the fourth side surface 602d are soldered to switch detection patterns on the surface of a substrate.

In this input device 1, X-Y coordinate data, etc. can be output by applying a pressing force in an inclination direction to the operating knob 606. When the pressing force of an inclination direction acts on the operating knob 606, in the actuating member 604, bending strain is given to at least one of the first X-direction deformable part 643a and the second X-direction deformable part 643b, and at least one of the first Y-direction deformable part 644a and the second Y-direction deformable parts 644b, and this bending strain is detected by the detecting elements 653x, 654x, 653y, and 654y.

As shown in FIG. 24, since the first X-direction protruding part 647a integral with the operating protrusion 646 is located on the first X-direction deformable part 643a, a large strain can be generated in the first X-direction deformable part 643a by a tilting force in the X1 direction acting on the operating knob 606. This is also the same in the other deformable parts 643b, 644a, and 644b.

For example, when a pressing force inclined in the X1 direction acts on the operating protrusion 646 by the operating knob 606, a strain in an expansion direction is given to the detecting element 653x provided in the back surface of the first X-direction deformable part 643a, and a strain in a contraction direction is given to the detecting element 654x provided in the back surface of the second X-direction deformable part 643b. In the circuit shown in FIG. 26A, when strains having polarities opposite to each other are given to the detecting element 653x and the detecting element 654x, the middle potential of the detecting element 653x and the detecting element 654x changes by about two times the amount of change of the resistance value of a detecting element. The change of this middle potential is given as an X output.

This is also the same when a pressing force is applied to the operating protrusion 646 such that the operating protrusion is tilted in the Y-direction. That is, expansion and contraction strains that are opposite to each other are given to the detecting element 653y and the detecting element 654y, respectively, and the middle potential of the detecting element 653y and the detecting element 654y changes. The change of this middle potential is given as a Y output. From the X output and Y output that are output in this way, coordinate input data can be generated.

Further, when the operating knob 606 is vertically pressed along its axial direction, the pressing projection 663 integrally provided in the operating knob 606 slides through the axis hole 646a of the actuating member 604, and the inverted part 673a of the inverting member 673 shown in FIG. 19, FIG. 20, etc. is inverted by the lower end of the pressing projection 663 to contact the central contact point 671a. As a result, the central contact plate 671 and the outside contact plate 672 can be electrically connected to each other, thereby detecting the switching output of a switch.

In addition, in the above embodiment, the tip part 647a1 of the first X-direction protruding part 647a provided integrally with the operating protrusion 646 of the actuating member 604 has a curved surface shape, and the tip parts 647b1, 648a1, and 648b1 of the other protruding parts 647b, 648a, and 648b also have a curved surface shape. However, these tip parts 647a1, 647b1, 648a1, and 648b1 may have an angled shape, a trapezoidal cross-sectional shape, etc.

Figure 26B:
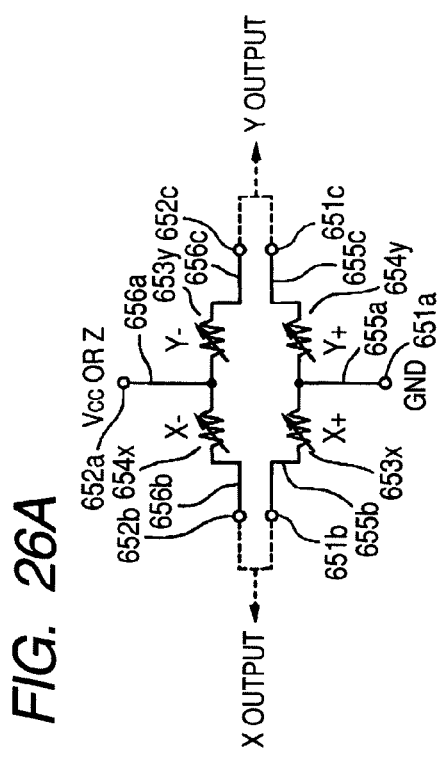
FIGS. 26B to 26D are circuit diagrams showing other configurations of the input device.
Figure 26C:
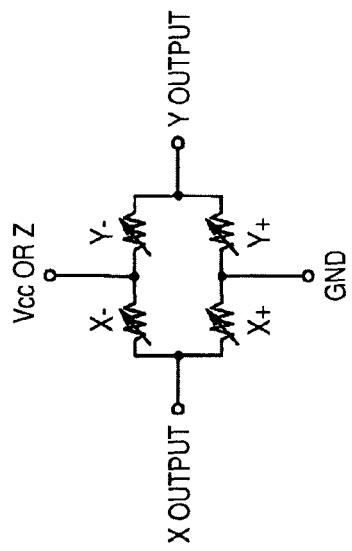
Figure 26D:
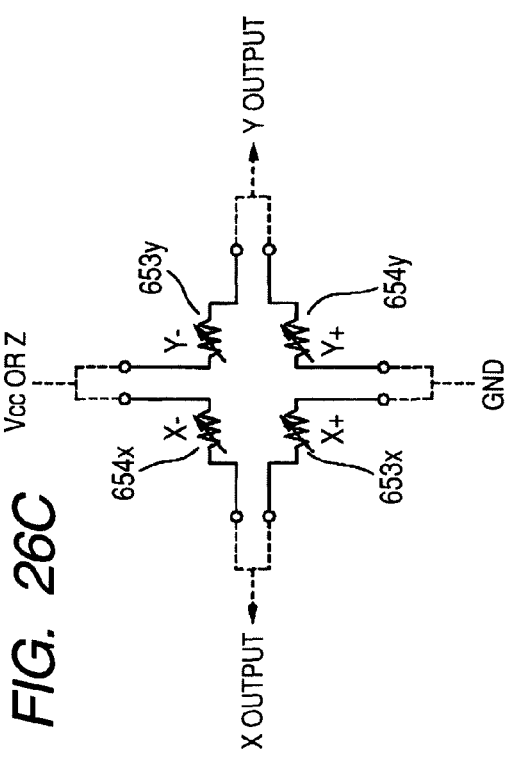

FIGS. 26B and 26C are circuit diagrams showing other embodiments of the wiring structure of the detecting elements disposed on the bottom surface 641 of the actuating member 604.

In the embodiment shown in FIG. 26B, six detecting terminals are provided in the actuating member 604. Wiring parts indicated by solid lines in FIG. 26B are conductive patterns formed on the bottom surface 641 of the actuating member 604, and the conductive patterns are connected to the detecting terminals, respectively. Wiring parts indicated by broken lines in FIG. 26B are circuit patterns provided outside the input device 601. A detecting terminal to which one end of the detecting element 654x is connected, and a detecting terminal to which one end of the detecting element 653y is connected are altogether connected to a power supply unit 1 on a substrate. Further, a detecting terminal connected to the detecting element 653x and a detecting terminal connected to the detecting element 654y is connected to a grounding part on the substrate. By including the circuit patterns shown in FIG. 26B, the routing structure of the conductor patterns on the bottom surface 641 of the actuating member 604 can be simplified.

In the embodiment shown in FIG. 26C, eight detecting terminals are provided in the actuating member 604. Wiring parts indicated by solid lines in FIG. 26C are conductive patterns formed on the bottom surface 641 of the actuating member 604, and the conductive patterns are connected to the detecting terminals, respectively. Wiring parts indicated by broken lines in FIG. 26C are circuit patterns provided outside the input device 601.

A connecting terminal to which the detecting element 654x is connected, and a connecting terminal to which the detecting element 653y is connected are connected to the outside of the input device 601, thereby generating X outputs. A connecting terminal, to which the detecting element 653y is connected, and a connecting terminal, to which the detecting element 654y is connected, are connected to the outside of the input device 601, thereby generating Y outputs. Further, a connecting terminal to which one end of the detecting element 654x is connected, and a connecting terminal to which one end of the detecting element 653y is connected are connected to a power supply unit outside the input device 601. Further, a detecting terminal connected to the detecting element 653x and a connecting terminal connected to the detecting element 654y is connected to a grounding part outside the input device 1.

In the embodiment shown in FIG. 26C, since both ends of each of the detecting elements 653x, 654x, 653y, and 654y are connected to a detecting terminal in a one-on-one relationship, routing of the conductor patterns on the bottom surface 641 of the actuating member 604 can be simplified.

The invention claimed is:
1. An input device comprising:
   an actuating member formed of a synthetic material and comprising:
      a pair of deformable parts extending along the same line and each having both sides partitioned by holes passing through the actuating member;
      an operating protrusion raised from between the pair of deformable parts in a direction away from the surfaces of the deformable parts; and
      a plurality of thick-walled parts, wherein the pair of deformable parts, the thick-walled parts and the operating protrusion are integrally formed; and
   detecting elements that detect elastic deformation of the deformable parts and that are configured such that electrical resistance of the detecting elements changes according to amount of strain in the deformable parts in an expansion direction and a contraction direction;
   a lower case defining a recess and including a bottom surface and a plurality of supporting surfaces raised from the bottom surface, the bottom surface and the plurality of supporting surfaces disposed in the recess; and
   an upper case disposed on the lower case and having a lower surface;
   wherein when the actuating member is mounted to the lower case, the thick-walled parts and the deformable parts are received in the recess with the thick-walled parts abutting against the plurality of supporting surfaces of the lower case and the lower surface of the upper case such that the thick-walled parts of the actuating member are sandwiched between the lower surface of the upper case and the plurality of supporting surfaces of the lower case, wherein the deformable parts have base ends located on the side of the operating protrusion, and tips located apart from the operating protrusion, and the operating protrusion is provided with protruding parts extending onto the deformable parts over the base ends, and wherein the actuating member is provided with a plurality of terminals electrically connected to the detecting elements, and the plurality of terminals appear on side surfaces of the lower case.

2. The input device according to claim 1, wherein each of the protruding parts provided in the operating protrusion extends onto the corresponding deformable parts.

3. The input device according to claim 1,
wherein the protruding parts have tip parts that are directed to the tips of the deformable parts, and a boundary line of the tip parts of the protruding parts extending onto the deformable parts is of a curved shape.

4. The input device according to claim 1,
wherein the width of each of the protruding parts extending onto the deformable parts over the base ends is smaller than the width of each of the deformable parts corresponding to a distance between the holes when measured in the same direction.

5. The input device according to claim 1,
wherein the upper case closes an opening of the recess of the lower case, and wherein the thick-walled parts are thicker than the deformable parts.

6. The input device according to claim 5,
wherein the lower case is made of synthetic resin, the upper case is formed of a metal plate and includes fixing claws integrally formed in the upper case, the fixing claws being bent towards a bottom surface of the lower case, and including soldered parts disposed at the bottom surface to be fixed to a substrate supporting the lower case.

7. The input device according to claim 1, wherein the plurality of terminals include six terminals with three on each of the opposing side surfaces of the actuating member, each of the plurality of terminals having a conductive piece provided on a bottom surface of the actuating member.

8. The input device according to claim 1, further comprising an operating knob including a plurality of fitting recesses, wherein the operating protrusion includes a plurality of protruding parts mating with the plurality of fitting recesses.

9. The input device according to claim 1, wherein the actuating member includes a plate member having the plurality of thick-walled parts and the deformable parts.

10. The input device according to claim 9, wherein the plate member is substantially square and the thick-walled parts are provided at four corners of the plate member.

11. The input device according to claim 9, wherein the operating protrusion is provided at a center of the plate member and extends perpendicularly from the plate member.

12. The input device according to claim 9, wherein the pair of deformable parts are disposed between the plurality of thick-walled parts.

13. The input device according to claim 9, wherein the holes of the deformable parts are formed adjacent to the thick-walled parts.

14. The input device according to claim 9, wherein the detecting elements are attached to a bottom surface of the deformable parts.

15. The input device according to claim 14, further comprising a plurality of conductive patterns formed on the bottom surface of the deformable parts, wherein the detecting elements are connected to the plurality of terminals by the conductive patterns.

16. The input device according to claim 1, wherein the lower case includes a plurality of side walls that surround the recess.

17. The input device according to claim 16, wherein the plurality of terminals of the actuating member engage the plurality of side walls when the actuating member is mounted to the lower case.

18. The input device according to claim 16, wherein the upper case includes a flat pressing part and a plurality of fixing claws extending downwardly from the flat pressing part toward the lower case, when the upper case is mounted to the lower case, the flat pressing part closing an opening of the recess of the lower case and the plurality of fixing claws engaging the side walls of the lower case.

19. An input device comprising:
an actuating member formed of a synthetic material and comprising:
a pair of X-direction deformable parts extending along in a straight line extending in an X-direction and each having both sides being partitioned by holes passing through the actuating member;
a pair of Y-direction deformable parts extending along a straight line extending in a Y-direction orthogonal to the X-direction and each having both sides being partitioned by holes passing through the actuating member;
an operating protrusion raised from between the pair of X-direction deformable parts and the pair of Y-direction deformable parts in a direction away from the surfaces of the X-direction deformable parts and the Y-direction deformable parts; and
a plurality of thick-walled parts;
wherein the pair of X-direction deformable parts, the pair of Y-direction deformable parts, the plurality of thick-walled parts and the operating protrusion are integrally formed; and
detecting elements that detect elastic deformation of each of the X-direction deformable parts and the Y-direction deformable parts and that are configured such that electrical resistance of the detecting elements changes according to amount of strain in the X-direction deformable parts and the Y-direction deformable parts in an expansion direction and a contraction direction,
a lower case defining a recess and including a bottom surface and a plurality of supporting surfaces raised from the bottom surface, the bottom surface and the plurality of supporting surfaces disposed in the recess; and,
an upper case disposed on the lower case and having a lower surface;
wherein when the actuating member is mounted to the lower case, the thick-walled parts and the deformable parts are received in the recess with the thick-walled parts abutting against the plurality of supporting surfaces of the lower case and the lower surface of the upper case such that the thick-walled parts of the actuating member are sandwiched between the lower surface of the upper case and the plurality of supporting surfaces of the lower case,
wherein the X-direction deformable parts and the Y-direction deformable parts each have base ends located on the side of the operating protrusion, and tips located apart from the operating protrusion, and the operating protrusion is provided with protruding parts extending onto the X-direction deformable parts over the base ends and protruding parts extending onto the Y-direction deformable parts over the base ends, and wherein the actuating member is provided with terminals electrically connected to the detecting elements, and the terminals appear on side surfaces of the lower case.

20. An input device comprising:

an actuating member comprising an operating protrusion, a plurality of deformable parts surrounding the operating protrusion, and a plurality of thick-walled parts, wherein the operating protrusion, the plurality of deformable parts and the plurality of thick-walled parts are integrally formed as a single piece;

a lower case defining a recess and including a bottom surface and a plurality of supporting surfaces raised from the bottom surface, the bottom surface and the plurality of supporting surfaces disposed in the recess;

an upper case disposed on the lower case and having a lower surface;

a flexible substrate bonded to the plurality of the deformable parts and disposed between the actuating member and the lower case; and a plurality of detecting elements provided on the flexible substrate and surrounded by the thick-walled parts of the actuating member, wherein the plurality of detecting elements are configured such that electrical resistance of the detecting elements changes according to amount of strain in the deformable parts in an expansion direction and a contraction direction, and wherein when the actuating member is mounted to the lower case, the thick-walled parts and the deformable parts are received in the recess with the thick-walled parts abutting against the plurality of supporting surfaces of the lower case and the lower surface of the upper case such that the thick-walled parts of the actuating member are sandwiched between the lower surface of the upper case and the plurality of supporting surfaces of the lower case.

* * * * *